(12) United States Patent
Buchmueller et al.

(10) Patent No.: US 11,407,511 B1
(45) Date of Patent: *Aug. 9, 2022

(54) DELIVERY DROP PLATFORMS, TETHERS, AND STABILIZATION

(71) Applicant: Amazon Technologies, Inc., Seattle, WA (US)

(72) Inventors: Daniel Buchmueller, Seattle, WA (US); Louis LeRoi LeGrand, III, Seattle, WA (US); Lowell Timothy Neal, Seattle, WA (US); Yves Christian Albers Schoenberg, Seattle, WA (US); Scott Michael Wilcox, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 681 days.

This patent is subject to a terminal disclaimer.

(21) Appl. No.: 15/954,482

(22) Filed: Apr. 16, 2018

Related U.S. Application Data

(63) Continuation of application No. 14/867,908, filed on Sep. 28, 2015, now Pat. No. 9,969,494.

(51) Int. Cl.
*B64D 1/12* (2006.01)
*B64C 39/02* (2006.01)

(52) U.S. Cl.
CPC .............. *B64D 1/12* (2013.01); *B64C 39/024* (2013.01); *B64C 2201/128* (2013.01)

(58) Field of Classification Search
CPC ... B64D 1/02; B64D 1/08; B64D 1/00; B64D 1/22; B64D 1/12; B64C 2201/128
See application file for complete search history.

(56) References Cited

U.S. PATENT DOCUMENTS

| 415,489 A | 11/1889 | Wood |
|---|---|---|
| 441,255 A | 11/1890 | Prichard |

(Continued)

FOREIGN PATENT DOCUMENTS

| EP | 0869096 B1 * | 9/2004 | |
|---|---|---|---|
| EP | 2987759 A1 * | 2/2016 | ........... B66C 13/063 |
| WO | WO2009144046 A1 | 12/2009 | |

OTHER PUBLICATIONS

Office Action for U.S. Appl. No. 16/101,311, dated Apr. 15, 2020, Buchmueller, "Delivery Drop Rate Modulation", 11 Pages.

(Continued)

*Primary Examiner* — Magdalena Topolski
(74) *Attorney, Agent, or Firm* — Lee & Hayes, P.C.

(57) ABSTRACT

An unmanned aerial vehicle (UAV) can deliver a package to a delivery destination. Packages delivered by a UAV may be lowered towards the ground while the UAV continues to fly rather than the UAV landing on the ground and releasing the package. Packages may sway during lowering as a result of wind or movement of the UAV. A package sway may be monitored and mitigated by rapidly paying out a tether, when using a winch mechanism, to dissipate the energy of the sway as downward energy. Further, the UAV may navigate in the direction of the sway or reduce the altitude of the UAV to dissipate the energy of the sway. Open-loop and/or closed loop drop techniques may be utilized to lower a package from the UAV, and the package may be released in the air or on the ground.

20 Claims, 13 Drawing Sheets

(56) References Cited

U.S. PATENT DOCUMENTS

| | | | |
|---|---|---|---|
| 535,248 | A | 3/1895 | Jenks |
| 617,267 | A | 1/1899 | Wiley, Jr. |
| 2,076,476 | A | 4/1937 | Mores |
| 2,151,395 | A | 3/1939 | Smith |
| 3,089,588 | A | 5/1963 | Correll |
| 3,113,751 | A | 12/1963 | Cotton |
| 3,756,543 | A | 9/1973 | Fowler et al. |
| 3,833,189 | A | 9/1974 | Fowler et al. |
| 5,788,186 | A | 8/1998 | White |
| 6,086,015 | A | 7/2000 | MacCready, Jr. |
| 6,655,636 | B1 | 12/2003 | Moritz et al. |
| 8,373,566 | B2 | 2/2013 | Yang |
| 8,413,923 | B2 | 4/2013 | Brenner et al. |
| 8,595,931 | B2 | 12/2013 | Riddell et al. |
| 9,174,733 | B1 | 11/2015 | Burgess et al. |
| 9,205,922 | B1 | 12/2015 | Bouwer |
| 9,321,531 | B1 | 4/2016 | Takayama et al. |
| 9,422,139 | B1 | 8/2016 | Bialkowski et al. |
| 9,493,238 | B2 | 11/2016 | Takayama et al. |
| 9,567,081 | B1 | 2/2017 | Beckman et al. |
| 9,580,173 | B1 | 2/2017 | Burgess et al. |
| 9,630,715 | B2 | 4/2017 | Takayama et al. |
| 9,650,136 | B1 | 5/2017 | Haskin et al. |
| 9,676,481 | B1 | 6/2017 | Buchmueller |
| 9,688,404 | B1 | 6/2017 | Buchmueller et al. |
| 9,725,168 | B2 | 8/2017 | Kim |
| 9,928,749 | B2 | 3/2018 | Gil et al. |
| 9,969,494 | B1 | 5/2018 | Buchmueller et al. |
| 10,071,804 | B1 | 9/2018 | Buchmueller et al. |
| 10,207,805 | B2 | 2/2019 | Evans |
| 10,249,200 | B1 | 4/2019 | Grenier et al. |
| 10,293,938 | B2 | 5/2019 | Thompson et al. |
| 10,301,021 | B2 | 5/2019 | Jones et al. |
| 10,358,217 | B2 | 7/2019 | Sekiya |
| 10,420,322 | B2 | 9/2019 | Jones et al. |
| 10,457,393 | B2 | 10/2019 | Thompson et al. |
| 2011/0084162 | A1 | 4/2011 | Goossen et al. |
| 2011/0137497 | A1 | 6/2011 | Jimenez |
| 2011/0192932 | A1* | 8/2011 | Brenner ............... B64C 27/04 244/17.13 |
| 2013/0334371 | A1 | 12/2013 | Potter et al. |
| 2014/0254896 | A1 | 9/2014 | Zhou et al. |
| 2015/0158587 | A1 | 6/2015 | Patrick et al. |
| 2015/0241198 | A1 | 8/2015 | Limvorapun et al. |
| 2015/0331427 | A1 | 11/2015 | Chaudary |
| 2016/0016665 | A1 | 1/2016 | Potter et al. |
| 2016/0151573 | A1 | 6/2016 | Binninger |
| 2016/0300229 | A1 | 10/2016 | Minnucci |
| 2017/0036777 | A1 | 2/2017 | Martin et al. |
| 2017/0081028 | A1 | 3/2017 | Jones et al. |
| 2017/0081029 | A1 | 3/2017 | Jones et al. |
| 2017/0197718 | A1 | 7/2017 | Buchmueller |
| 2017/0205536 | A1 | 7/2017 | Musso |
| 2017/0320572 | A1 | 11/2017 | High et al. |
| 2017/0349376 | A1 | 12/2017 | Porat |
| 2018/0281954 | A1 | 10/2018 | Atchley et al. |
| 2018/0282014 | A1 | 10/2018 | Atchley et al. |
| 2019/0100314 | A1 | 4/2019 | Prager et al. |
| 2019/0235527 | A1 | 8/2019 | O'Brien et al. |
| 2019/0263522 | A1 | 8/2019 | Simon et al. |
| 2020/0094962 | A1 | 3/2020 | Sweeny et al. |

OTHER PUBLICATIONS

Office Action for U.S. Appl. No. 14/868,005, dated Nov. 2, 2017, Buchmueller, "Delivery Drop Rate Modulation", 21 pages.

Office Action for U.S. Appl. No. 14/867,908, dated Sep. 26, 2017, Buchmueller, "Delivery Drop Platforms, Tethers, and Stabilization", 8 pages.

* cited by examiner

DELIVERY DROP PLATFORMS, TETHERS, AND STABILIZATION

CROSS-REFERENCE TO RELATED APPLICATIONS

This application is a continuation of, and claims priority to, co-pending, commonly-owned U.S. patent application Ser. No. 14/867,908, filed on Sep. 28, 2015, the entire disclosure of which is incorporated herein by reference.

BACKGROUND

The delivery of items typically includes picking and packaging the items, providing the packaged items to a carrier for delivery, and delivering the items. Even for small items or small numbers of items, boxes or other packages are transported by relatively large vehicles over roads, sometimes across long distances.

One alternative to road-based delivery is to deliver packages through the air using an unmanned aerial vehicle (UAV). As package delivery by a UAV becomes more common, delivery by a UAV presents many challenges and design considerations. For example, it may not always be possible to land a UAV to deliver a package, and it may not always be possible to drop a package to the ground from a particular height above the ground.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
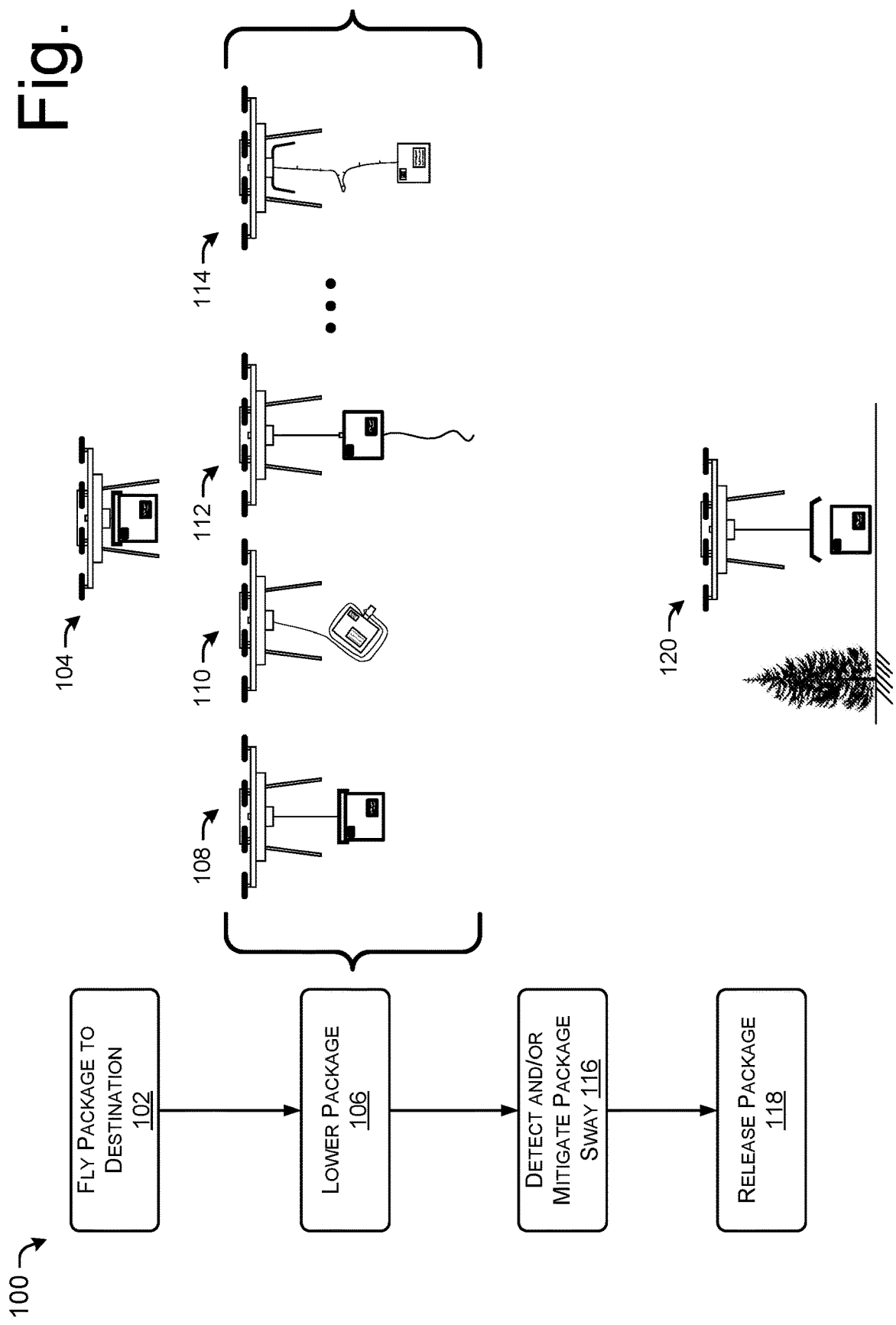
FIG. 1 is a pictorial flow diagram of a process to deliver a package to a destination using an unmanned aerial vehicle (UAV), while compensating for sway of the package during delivery, in accordance with embodiments of the disclosure.

This disclosure provides methods, apparatuses, and systems for delivery drop platforms, tethers, and stabilization for delivering a package assembly using an unmanned aerial vehicle (UAV). For example, open-loop and closed-loop (e.g., active and passive, respectively) embodiments are provided to drop a package assembly from the UAV while the UAV is airborne, rather than requiring the UAV to land before delivering the package. When a package or package assembly is being lowered from the UAV using a winch or spool mechanism, for example, a sudden gust of wind may introduce a sway or swing into the descent of the package. This sway or swing may present challenges because it may cause the package to be delivered outside of a designated or intended area, or may cause the package to contact an obstacle, such as a tree or house. By increasing the rate of lowering the package (e.g., by increasing the rate of paying out a tether or cable using the winch) the sideways potential energy in the sway or swing may be converted to downward kinetic energy, which may mitigate or prevent any increase in the period or magnitude of the package swing.

In various embodiments, the UAV may deliver a package assembly using closed-loop embodiments including monitoring a sway of a package and modulating the descent of the package to reduce or mitigate a sway of a package. For example, a sway of a package may be monitored or determined by using an image sensor tracking the position of a package relative to a position on a ground, such as a marker at a delivery location. In another example, a tension of a tether may be monitored to determine additional tension caused by a sway of a package. These and other embodiments are discussed throughout this disclosure.

In some open-loop embodiments, a sway of a package may not be monitored but a descent of a package may be modulated to control the rate of descent and reduce or mitigate a sway of a package. In one open-loop embodiment, a tether used to lower a package assembly may be wrapped around a container in a number of directions (e.g., clockwise and counter-clockwise, or around the container and double-backed a number of times) such that when the package assembly is released from the UAV, the wrappings of the tether around the container cause the package assembly to rotate as the tether unspools from the container. Because the tether is rotated around the container in a number of directions, the package changes the direction of rotation throughout the descent, thereby slowing the descent. In another embodiment, a tether may be lowered from the UAV before a package is released from the UAV. The package is attached to the tether with an attachment mechanism that allows the package to slide up and down the tether. The package is released from the UAV and the package slides down the tether to the delivery zone. In this example, the descent of the package may be slowed by friction between the tether and the attachment mechanism attaching the package assembly to the tether.

As another example of an open-loop embodiment, the package may be lowered using a type of "rip-strip" lowering mechanism that is coupled to the package and the UAV. For example, the rip-strip may be a webbing folded over on itself and coupled with hook-and-loop fasteners. After the package assembly is released from the UAV, the hook-and-loop fasteners may open, thereby slowing the descent of the package. Instead of or in addition to the hook-and-loop fasteners, the rip-strip may include magnets, buttons and snaps, or any tearable or breakable thread, string, or plastic sized to detach based on a weight of the package assembly. In some embodiments, the various lowering methods may be used in combination. For example, a package may first be lowered using the rotation descent technique described above, followed by lowering the package using a winch mechanism.

Further, methods, apparatuses, and systems are provided to decouple the package assembly from the UAV after the package assembly has been lowered. In an embodiment where a winch mechanism is used, the winch mechanism may include an attachment mechanism such as a lowering platform to release the package assembly at a desired height above the drop zone, after which the winch mechanism may retract the tether and the lowering platform to the UAV. In other embodiments, the tether, line, or cable may be detached, cut, or sectioned by the UAV, allowing the tether to fall away from the UAV to the ground. In other embodiments, the tether may be arranged to passively fall away from the UAV after the package assembly is lowered from the UAV.

The methods, apparatuses, and systems described herein may be implemented in a number of ways. Example implementations are provided below with reference to the following figures.

FIG. 1 is a pictorial flow diagram of a process 100 to deliver a package to a destination using an unmanned aerial vehicle (UAV), while compensating for sway of the package during delivery, in accordance with embodiments of the disclosure.

At 102, a UAV 104 may transport a package or cargo by air travel to a destination. The package may include an item, multiple items, or a container that contains one or more items. For example, the package may be an item wrapped in retail package, a bag of groceries, a bouquet of flowers, and/or other items that may or may not be contained in a bag, box, or other container.

At 106, after arriving at the destination (i.e., a delivery location), the package is lowered. In accordance with embodiments of the disclosure, a UAV may use open- loop or closed-loop techniques (e.g., active and/or or passive embodiments) to lower the package from the UAV. For example, a UAV 108 may use a winch mechanism coupled with a delivery platform to lower a package to a delivery location. In another example, a drum and brake may be used to lower a package with a tether spooled around the drum, whereby the tether slips off the drum when fully extended to release the package. As another example, a UAV 110 may use a package assembly with a tether wound around the package assembly to cause the package assembly to rotate in various directions as it descends, thereby slowing the descent of the package. As another example, a UAV 112 may use a tether on which a package assembly may be attached to slide down the tether to the delivery location. As a further example, a UAV 114 may be coupled with a rip-strip lowering mechanism which includes fasteners adapted to release under the weight of the package and provide a controlled descent of the package to the delivery location.

The package may be lowered using open-loop or closed loop embodiments for reducing, mitigating, or damping a sway of a package. In some embodiments, a UAV may utilize an entirely passive system (aside from releasing the package), while in other embodiments, the UAV 110 may include a winch mechanism or spool mechanism, along with a passive lowering mechanism, to raise or lower the package, or to mitigate sway of a package, as discussed below in operation 116. Details of the various techniques for lowering a package are further discussed in connection with FIGS. 2-9.

At 116, the UAV detects and/or mitigates package sway. For example, sensors in the UAV, such as an image sensor or a sensor detecting the position of the package relative to the UAV, detect a change in a position of a package or an angle of the tether lowering a package, and the UAV performs actions to reduce or mitigate the sway. For example, using an active winch mechanism, the UAV may increase a rate of paying out cable, dropping the package, and converting the sideways potential energy of the sway into a downward kinetic energy of the package descent. In another example, the UAV may navigate horizontally and/or vertically to absorb or redirect the sideways potential energy of the sway into kinetic energy moving downwards. In another example, a combination of techniques may be used to efficiently mitigate the sway of a package. In some open-loop embodiments, the sway of the package may be mitigated without detecting the sway of the package; that is to say, the apparatus and/or techniques for lowering the package may mitigate a package sway in an open-loop manner. Details of the various techniques for lowering a package are further discussed in connections with FIGS. 2-9.

At 118, the UAV 120 may release a package at the delivery location. In various embodiments discussed throughout this disclosure, the package may be released from the delivery platform or a tether may be decoupled with the UAV 120 or the package. In some embodiments, the package may be released while the package is above the ground or the package may be released after the package has made contact with the ground.

Figure 2:
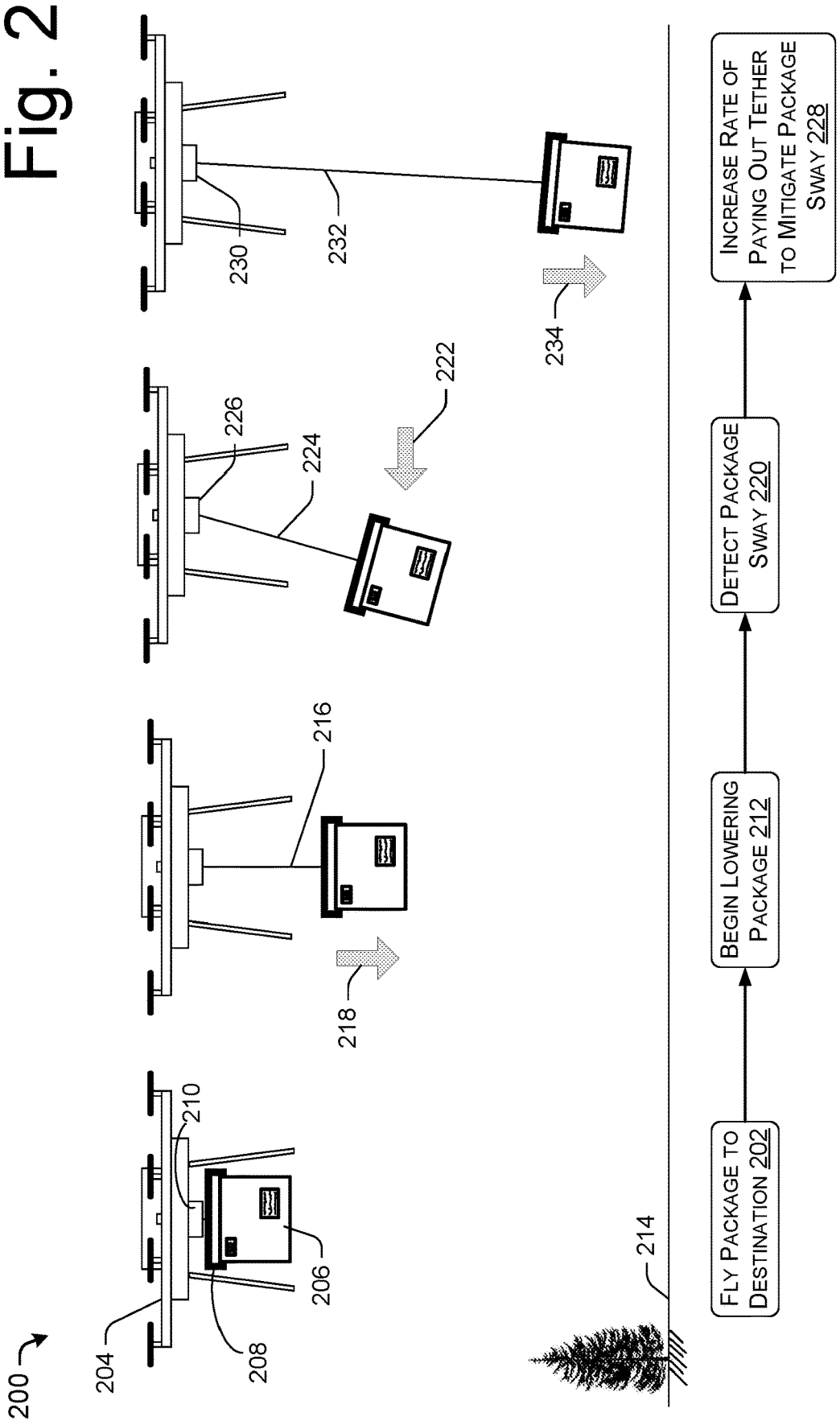
FIG. 2 is a pictorial flow diagram of a process to lower a package assembly from a UAV using a winch mechanism while compensating for sway of the package assembly, in accordance with embodiments of the disclosure.

FIG. 2 is a pictorial flow diagram of a process 200 to lower a package assembly from an unmanned aerial vehicle (UAV) using a winch mechanism while compensating for sway or swing of the package assembly, in accordance with embodiments of the disclosure.

At 202, a UAV 204 may transport a package or cargo 206 by air travel to a destination. The package 206 may include an item, multiple items, or a container that contains one or more items, as may be apparent in the context of this disclosure. The package 206 may be attached or coupled to the UAV 204 via a platform 208 that may be raised and lowered from the UAV 204 via a winch mechanism 210. The platform 208 may include clamp hooks or any mechanism to secure the package 206 during transport and release the package 206 at the destination. Further, the platform 208 may include any active stabilization elements such as fans or thrusters to direct the platform 208 while the platform 208 is being raised or lowered by the winch mechanism 210. Further the winch mechanism 210 may include one or more winches and tethers to raise and lower the platform 208 at a variable rate of speed. Additional details and embodiments of the platform 208 and winch mechanism 210 are described in U.S. patent application Ser. Nos. 14/558,048 and 14/681,343, the entirety of which are herein incorporated by reference.

In some embodiments, the winch mechanism 210 may include a motor to raise and lower the package 206, while in some embodiments the winch mechanism 210 may include a drum mechanism and brake mechanism to lower the package 206 using gravity alone. For example, a tether may be wrapped around a drum, and a brake may be modulated by the UAV 204 to control the rate of descent of the package. In some embodiments, the brake may be modulated to increase the rate of descent when a sway is detected, as discussed herein. In some embodiments, the brake mechanism may be controlled wirelessly by the UAV, while in some embodiments, the brake mechanism may be configured to modulate the friction based on the distance traveled by the package and/or according to a predetermined schedule. Further, in some embodiments, the tether may detach from the drum when the tether is fully unspooled.

In some embodiments, the winch mechanism 210 may be attached to the UAV 204, while in some embodiments, the winch mechanism may be attached to or integrated with the platform 208 or the package 206.

At 212, the UAV 204 begins lowering the package 206. This operation may include determining whether the destination is clear of objects, people, or obstructions that may interfere with lowering of the package 206. For example, the UAV 204 may use cameras, proximity sensors, and/or other image sensors to survey the destination. Further, operation 212 may include navigating the UAV 204 to hover at an optimal altitude or elevation above the ground 214. For example, the UAV 204 may position itself at an altitude above a minimum altitude and below a maximum altitude for delivering the package 206. As the package is lowered, the winch mechanism 210 pays out cable 216, causing the package 206 and platform 208 to move in a downwards direction 218.

At 220, the UAV 204 may detect package 206 sway. For example, the UAV 204 may use sensors to detect a horizontal movement 222 of the package 206, caused by a sudden gust of wind, for example, or a change in position of the UAV 204. In some embodiments, the UAV 204 may use one or more image sensors or stereoscopic cameras oriented towards the package 206 to provide an image or multiple images representing multiple angles of the package 206 from which to determine when the package 206 sways. For example, the UAV 204 may monitor images from the one or more image sensors while lowering a package to detect the movement of the package 206 and/or the movement of the cable 224. In some embodiments, an image sensor may monitor one or more markers on the package 206, for example, and one or more markers on the ground at the delivery location. Upon detecting a change in relative or absolute position of one or both of the markers, the UAV 204 may determine that the package 206 has begun to sway. Based on the detected sway, the UAV 204 may navigate the UAV 204 in the direction of the sway and/or may modulate a rate of descent of the package 206. In some embodiments, the UAV 204 may detect a package 206 sway before the package 206 sway causes the UAV 204 to move out of position.

In addition to or instead of the image sensors discussed above, in various embodiments, the UAV 206 may use radar or LIDAR (e.g., laser-based radar) to track the sway of the package 206 relative to the position of the UAV 204. In various embodiments, the package 206 sway may be detected by radio frequency identification (RFID) tags applied to the platform 208 and/or the package 206 and triangulating the position of the RFID tags with respect to the position of the UAV 204. For example, an RFID sensor on the UAV 204 may monitor the RFID tags on the platform 208 and/or the package 206 and may detect a change in a signal strength indicating a change in position of the RFID tags relative to the sensors. By monitoring an increased signal in a first sensor, for example, and a decreased signal in a second sensor, for example, indicating relative or absolute distances from RFID tags to the RFID sensors, the UAV 204 may detect a sway of the platform 208 and/or the package 206.

In various embodiments, the package sway may be detected by measuring, detecting, or determining a change in angle of the cable 224 with respect to the UAV 204. For example, an image sensor may monitor the angle of the cable 224 with respect the UAV 204, in conjunction with an image processing algorithm, to detect an angle of the cable 224. In various embodiments, the cable 224 may be routed through a sensor (e.g., such as a tube or straw) that bends or is deflected by the cable 224 when the package 206 begins to sway, whereby the amount of deflection of the sensor is proportional to a sway of the package 206. Detecting the sway of the package 206 may be provided by sensors included with the UAV 204 and/or the winch mechanism 226. For example, in some embodiments, a tension sensor may be provided to monitor a tension in the tether 224. In such an example, the UAV 204 may determine a sway of the package 206 by determining the tension in the tether 224, while factoring in a wind speed, rate of descent, physical characteristics of the package 206, etc.

As may be understood in the context of this disclosure, operation 220 may be omitted in some open-loop embodiments. That is to say, the UAV 204 may modulate the rate of descent of a package according to a schedule without feedback determining a sway of a package.

At 228, the UAV 204 increases the rate of paying out the tether to mitigate the package sway. As discussed above, a sudden gust of wind may cause the package 206 to move horizontally 222, thereby adding potential energy to the package 206 as a form of height vis-à-vis the UAV 204 and package 206 system, which can be viewed as a pendulum system. Accordingly, if the winch mechanism 230 rapidly pays out cable 232 (or increases the rate of paying out cable 232), the potential energy added to the package 206 through the horizontal movement 222 may be converted to kinetic energy by moving the package 206 in a downward direction 234. Further, considering the UAV 204 and package 206 system as a pendulum system, the period or magnitude of the sway or swing of the package 206 may be reduced by increasing the length of the cable 232, which may slow down the horizontal component of movement of the package 206, thereby making it easier to safely deliver the package 206. On the other hand, the winch mechanism 230 may take in or retract the cable 232 if it is desirable to increase the period of the sway or swing of the package 206, for example, to avoid an obstacle or interference from another object, or to compensate for movement of the UAV 204. Further, the UAV 204 may navigate in any direction (e.g., upwards, downwards, and/or toward or away from a direction of the sway) to dissipate an energy of the sway of the package 206. As may be understood in the context of this disclosure, the package 206 may be released from the platform 208 either when the package is determined to reach the ground 214, or when the package is determined to be a predetermined height above the ground 214.

Figure 3:
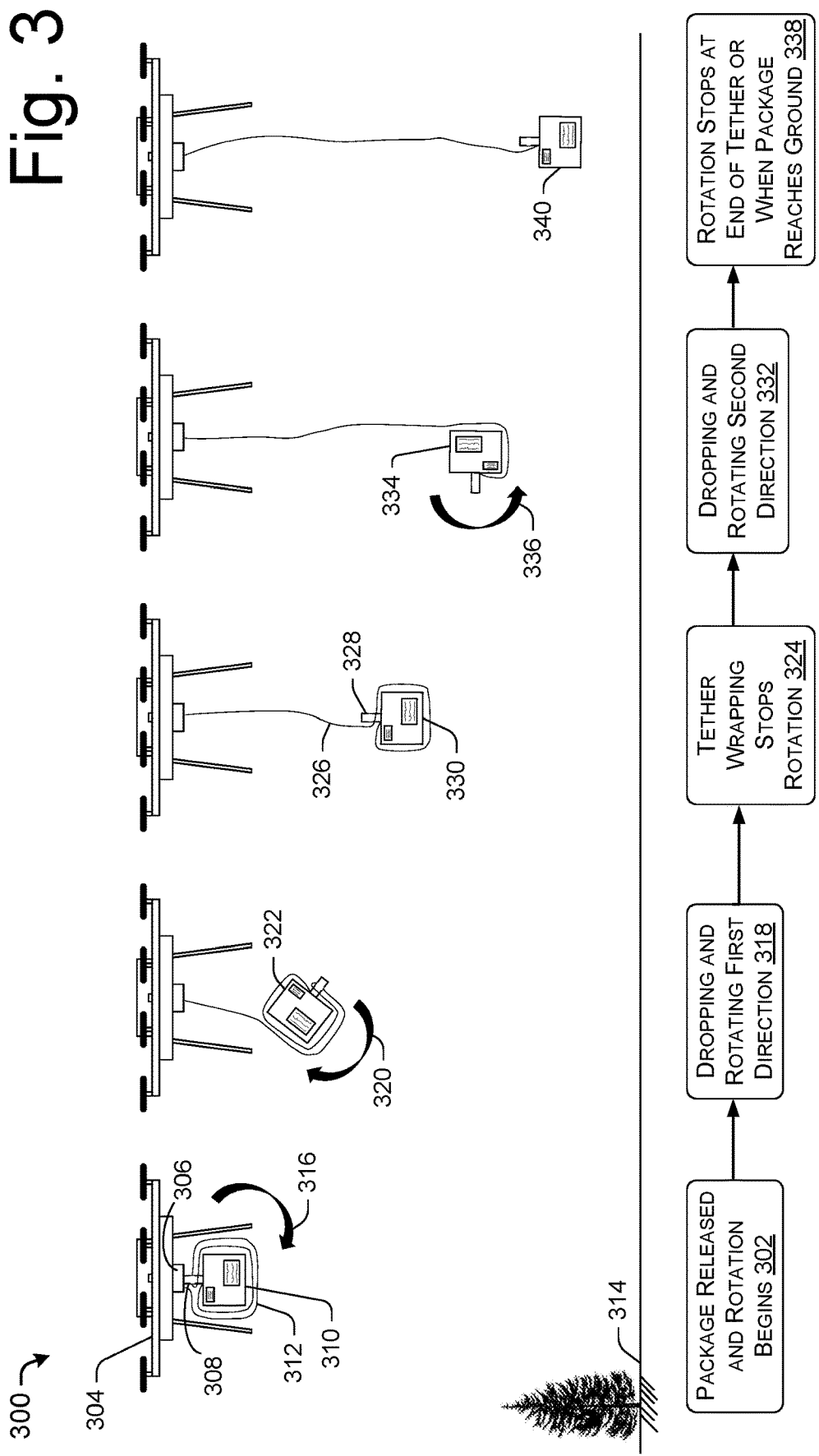
FIG. 3 is pictorial flow diagram of a process to lower a package assembly from a UAV towards the ground using a tether wrapped around the package assembly to introduce rotations during the descent, in accordance with embodiments of the disclosure.

FIG. 3 is pictorial flow diagram of a process 300 to lower a package assembly from a UAV towards the ground using a line or tether wrapped around the package assembly to introduce rotations into the fall, in accordance with embodiments of the disclosure.

At 302, the UAV 304 releases the package, initiating the rotation and descent of the package. More specifically, the UAV 304 actuates an attachment mechanism 306, which is coupled with a corresponding package attachment point 308, to release the package 310 from the UAV 304. As it may be understood in the context of this disclosure, the UAV 304 may use any attachment mechanism as the attachment mechanism 306, such as clamps, hooks, magnets, and/or electromagnets, to secure and selectively release the package 310 from the UAV 304. As may be understood in the context of this disclosure, process 300 may include an operation to fly the UAV 304 to the destination, similar to operation 202 of FIG. 2.

By way of example, FIG. 3 shows a tether 312 attached to the attachment mechanism 306, whereby the tether is first wrapped counter-clockwise around the package 310, is looped around the package attachment point 308, is next wrapped clockwise around the package 310, and is finally attached to the package 310 at a top of the package 310 proximate to the package attachment point 308. As may be understood in the context of this disclosure, the tether 312 may be wrapped any number of times around the package 310, with any number of direction changes, double-backs, or reversals around the perimeter of the package 310. For example, the amount of tether wrapped or disposed around the package 310 may be a predetermined length corresponding to an intended altitude from which the UAV 304 may release the package 310. In some embodiments, the length of the tether 312 may be determined such that the package 310 contacts the ground 314 before the tether 312 is fully unwound from the package 310, while in some embodiments, the tether 312 may be sized such that the package 310 does not contact the ground 314 when the line or tether 312 is fully unwound from the package 310. Further, the tether 312 may be wrapped around one or more axes of the package 310 (e.g., around six sides of a rectangular package). Embodiments of the package 310 and tether 312 are further discussed below in connection with FIG. 6.

Based on the direction of the wrapping of the tether 312 around the package 310, when the package 310 is released or detached from the UAV 304, the package 310 will begin to rotate as it descends, according to the rotation 316 illustrated in FIG. 3. It may be understood in the context of this disclosure that the tether 312 may be wrapped in any direction around the package 310 to initiate any direction of rotation of the package 310 during descent.

At 318, the dropping and rotating of the package 310 continues in the first direction, illustrated as the arrow 320. Although not to scale and for illustrative purposes only, FIG. 3 shows that the package 322 has descended and rotated with respect to the package 310.

At 324, the configuration of the tether wrapping momentarily stops the rotation (and descent) of the package. As illustrated in FIG. 3, the line or tether 326 is wrapped around the package attachment point 328, thereby reversing the direction of the wrapping of the tether 326 from a counter-clockwise wrapping around the package 310 to a clockwise wrapping around the package 310. This change in direction of the tether 326 causes the package 330 to slow and stop its rotation, which momentarily stops or slows the descent of the package 330. As this change in rotation of the package may introduce a certain amount of "bouncing" in the descent of the package 330, the UAV 304 may monitor the descent of the package 330 and periodically or continuously update a position of the UAV 304 relative to the intended delivery location of the package 330. For example, the UAV 304 may maintain an altitude and/or position of the UAV 304 required for the delivery location.

At 332, the package 334 continues dropping and rotating in a second direction, as indicated by the rotation arrow 336. As may be understood in the context of this disclosure, the tether 312 may be wrapped around one or more axes of the package 310. Further, as may be understood, the tether 312 may be wrapped around the package in a predetermined pattern (such as illustrated in FIG. 3), or may be wrapped in a random or non-uniform manner (e.g., with one wrap around the package 310 in a first direction, followed by two wraps around the package 310 in a second direction, followed by a half-wrap around the package in the first direction, followed by one wrap in a third direction). In this embodiment, the descent of the package may be largely controlled by the direction and number of wrappings of the tether 312 around the package 310. For example, operations 318, 324, and 332 may be repeated any number of times according to the length of the tether 312 around the package 310, the dimensions of the package 310, and/or the altitude of the UAV 304 when the package 310 is released from the UAV 304.

At 338, the rotation of the package stops either when the tether is fully unwrapped from the package, or when the package reaches the ground. For example, the UAV 304 may be positioned at an altitude based in part on the length of the tether 312 to guarantee that the package 340 does or does not reach the ground 314. As may be understood in the context of this disclosure, the tether 312 may be securely attached to the package 340, may be configured to release from the package 340 at a predetermined point (e.g., by wrapping the tether 312 around itself near the end of the tether 312 proximate to the package 310), or may be cut, sectioned, or otherwise decoupled from the UAV 304 at an indicated elevation or time. Further embodiments describing decoupling the tether and package are discussed in connection with FIGS. 9A, 9B, 9C, and 9D.

In various embodiments, the UAV 304 may include a winch or spool mechanism and/or the UAV may navigate (e.g., to change a horizontal or vertical position) to reduce a sway of the package as the package descends. For example, while the package 310 descends in process 300, the UAV 304 may detect a sway in the package 310 and may pay out additional tether 312, or the UAV 304 may rapidly descend or change horizontal position to reduce or mitigate the package sway.

Figure 4:
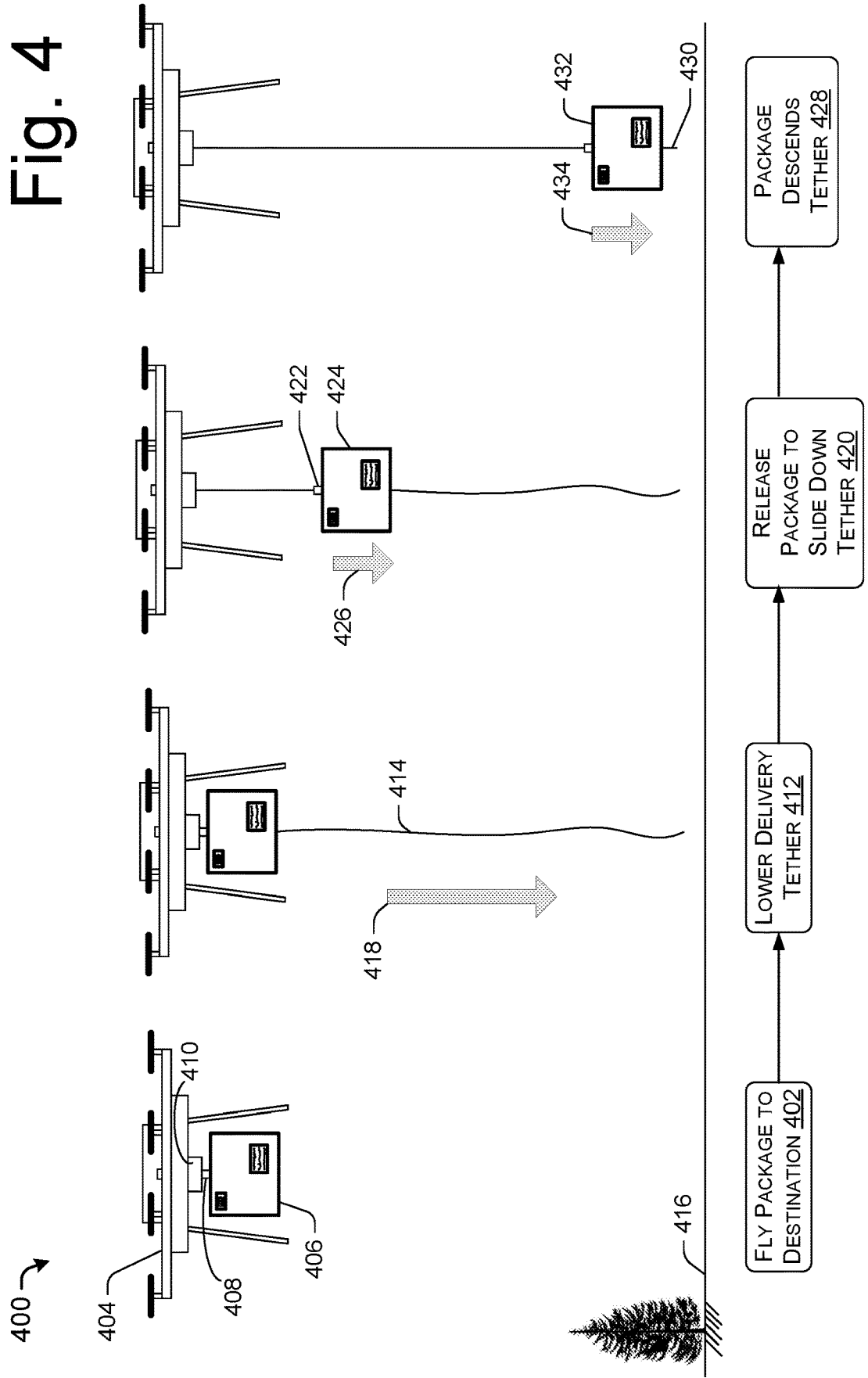
FIG. 4 is a pictorial flow diagram of a process to lower a package assembly from a UAV towards the ground by using a rappel method, in accordance with embodiments of the disclosure.

FIG. 4 is a pictorial flow diagram of a process 400 to lower a package assembly from a UAV towards the ground using a rappel method, in accordance with embodiments of the disclosure.

At 402, the UAV 404 may transport a package or cargo 406 by air travel to a destination. The package 406 may include an item, multiple items, or a container that contains one or more items, as may be apparent in the context of this disclosure. The package 406 may include a package attachment point 408, whereby elements 406 and 408 may be referred to as a "package assembly." Further, the package attachment point 408 may be attached or coupled to the UAV 404 via an attachment mechanism 410. The package attachment point 408 may comprise a single attachment point, as illustrated in FIG. 4, or may include clamps, hooks, fasteners, magnets, electromagnets, or the like, as may apparent in the context of this disclosure. As may be apparent in FIG. 4, a tether may be stowed during transit of the UAV to the destination.

At 412, after the UAV 404 has arrived at the destination, the delivery tether 414 is lowered, dropped, or otherwise released from the UAV 404 towards the ground 416. Arrow 418 illustrates that the tether 414 may be deployed in some embodiments before the package 406 is lowered for delivery. In other embodiments, the tether 418 may be released as the package 406 is released. As will be discussed in more detail in connection with FIG. 7, the tether 414 may be stowed or stored within the package assembly 406 or within the UAV 404 during transit, and may be released by a releasing mechanism, in accordance with embodiments of the disclosure.

At 420, the package is released to descend the tether 414 (e.g., to slide down the tether) towards the ground. For example, the package attachment point 422 or the package 424 may include a rappel mechanism (as discussed in connection with FIG. 7) coupled with the tether 414 to provide friction to slow the descent of the package assembly 424. The descent of the package assembly is shown as downward arrow 426. In some embodiments, the rate of descent of the package assembly may be controlled by a brake or by varying the properties of the tether 414 (e.g., width, thickness, stiffness, roughness, coefficient of friction, etc.), in combination with a friction mechanism.

At 428, the package descends the tether towards the delivery location on the ground. A distal end of the tether 430 may allow the package 432 to slide off the tether 430, or may obstruct the downward motion 434 of the package 432 at an intended point. As may be apparent in the context of this disclosure, the UAV 404 may be positioned at an altitude and/or the length of the tether 430 may be sized such that the package 432 may contact the ground 416 while connected to the tether 430, the package 432 may slide off the end of the tether 430 while the package is above the ground, or the package 432 may stop at a designated point on the tether 430 (e.g., at a knot, stop, chock, block, or any stopping mechanism).

In various embodiments, the UAV 404 may include a winch or spool mechanism and/or the UAV 404 may navigate (e.g., to change a horizontal or vertical position) to reduce a sway of the package as the package descends. For example, while the package 406 descends in process 400, the UAV 404 may detect a sway in the package 406 and may pay out additional tether 414, or the UAV 404 may rapidly descend or change horizontal position to reduce or mitigate the package sway.

Figure 5:
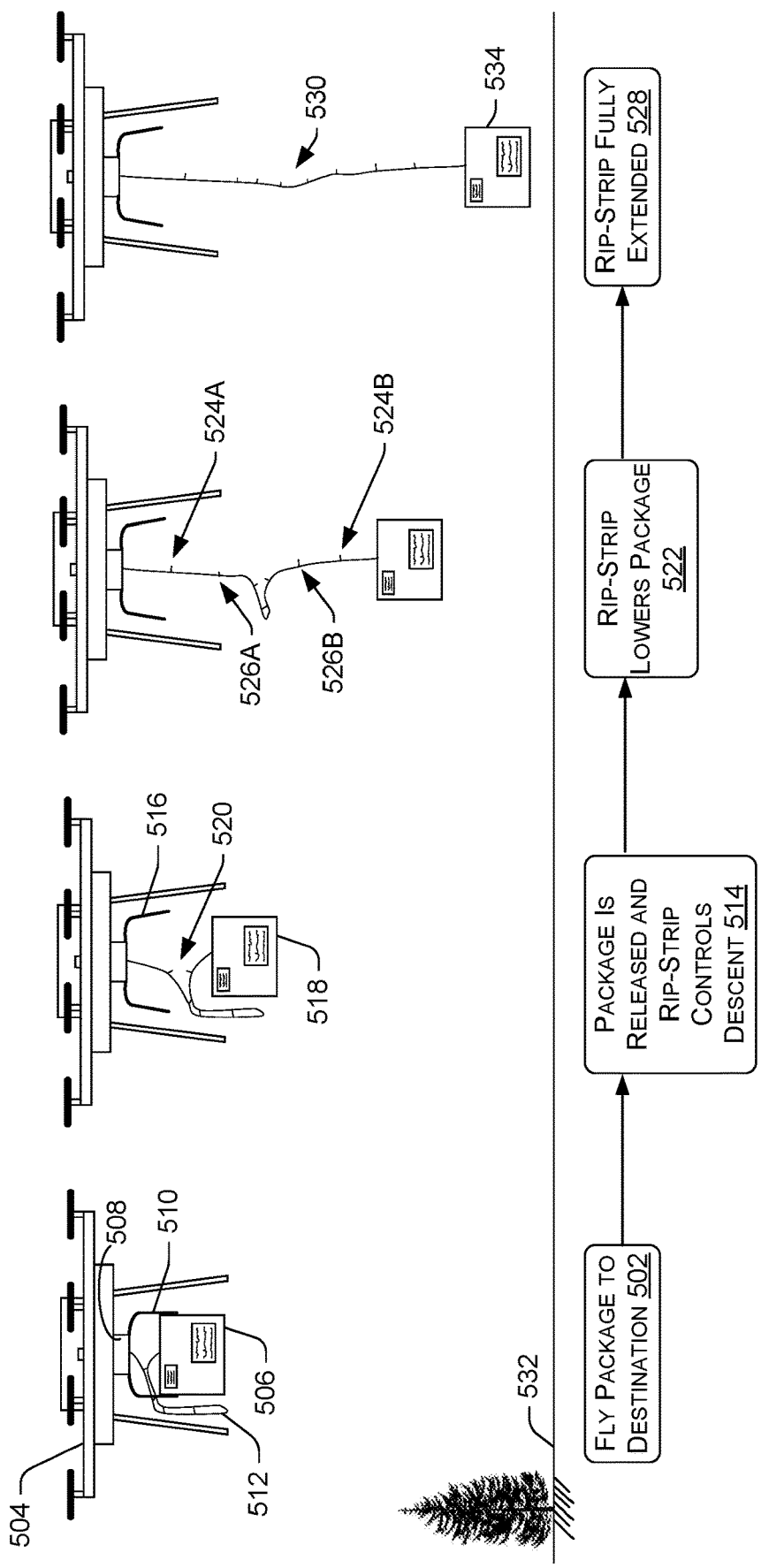
FIG. 5 is a pictorial flow diagram of a process to lower a package from a UAV towards the ground by using a rip-strip method, in accordance with embodiments of the disclosure.

FIG. 5 is a pictorial flow diagram of a process 500 to lower a package from a UAV towards the ground by using a rip-strip lowering mechanism, in accordance with embodiments of the disclosure.

At 502, the UAV 504 may transport a package or cargo 506 by air travel to a destination. The package 506 may include an item, multiple items, or a container that contains one or more items, as may be apparent in the context of this disclosure. The package 506 may be secured to the UAV 504 by an attachment mechanism 508 operating clamping arms 510 (or any other attachment mechanism discussed in this disclosure) to secure and release the package 506 at the destination. Further, the package 506 may be coupled with a rip-strip 512, which may connect the package 506 with the attachment mechanism 508. The structure and operation of embodiments of the rip-strip 512 may become apparent in connection with the remainder of process 500, and is described in further detail in connection with FIG. 8.

At 514, the package is released and the rip-strip controls the descent of the package. For example, clamping arms 516 have released the package 518, allowing the package 518 to begin its descent. As the descending package 518 creates tension in the rip-strip 512, the rip-strip 512 pulls apart at a first location 520, allowing the package 518 to descend in a controlled fashion. In various embodiments, the rip-strip 512 may be formed of webbing, rope, plastic, or any other suitable material, such as nylon webbing, configured to be double-backed or folded in half, with releasable fasteners, such as hook-and-loop fasteners, buttons and snaps, magnets, adhesives, or any other suitable fastener, coupling the two halves (or any portion) of the webbing together.

At 522, the rip-strip provides a controlled descent for the package. As illustrated in FIG. 5, fasteners 524A and 524B correspond to the first location 520. Further, fasteners 526A and 526B comprise corresponding fasteners, which are illustrated as having been opened or released as the package descends. As may be understood in the context of this disclosure, fasteners in the rip-strip 512 may be selected based on a weight of the package 506, as well as a desired rate of descent for the package 506. For example, fasteners with a low release force limit, rating, or test (e.g., configured to separate under 1 pound of force) may allow the package 506 to descend at a faster rate than fasteners with a higher release force limit, rating, or test (e.g., configured to separate under 5 pounds of force). As may be understood in the context of this disclosure, fasteners of any release force limit, rating, or test may be used, and the examples given above are not considered to be limiting. Further, fasteners of the rip-strip 512 may be chosen to allow the package 506 to accelerate or decelerate based on a rating of the fasteners, a number of fasteners, locations of the fasteners about the rip-strip 512, and/or a weight of the package 506. The fasteners are pulled apart one after another to control the descent of the package 506.

At 528, the rip-strip 530 is fully extended. In some embodiments, the length of the rip-strip 530 may be selected based on a drop height of the UAV 504, such that the rip-strip 530 may be fully extended above the ground 532, while in some embodiments, the length of the rip-strip 530 may be selected such that the package 534 may contact the ground before the rip-strip 530 is fully extended. Further, it may be understood in the context of this disclosure that the rip-strip 530 may be detached from the package 534 or from the UAV 504 (i.e., the rip-strip 530 may remain with the package 534 at the delivery destination, or the rip-strip 530 may remain with the UAV 504).

In various embodiments, the UAV 504 may include a winch mechanism (e.g., coupled with the rip-strip 512) and/or the UAV may navigate (e.g., to change a horizontal or vertical position) to reduce a sway of the package as the package descends. For example, while the package 506 descends in process 500, the UAV 504 may detect a sway in the package 506 and may pay out additional tether coupled to the rip-strip 512, or the UAV 504 may rapidly descend or change horizontal position to reduce or mitigate the package sway.

As may be understood in the context of this disclosure, the lowering mechanisms described herein may be combined in any manner. For example, in some embodiments, a rip-strip similar to that described in FIG. 5 may be wrapped around a package in the manner described in connection with FIG. 3. In this manner, the descent of the package may be modulated by the force required to extend (i.e., separate) the rip-strip, as well as by the changing a rotation of the package as the package descends, as described herein.

Figure 6:
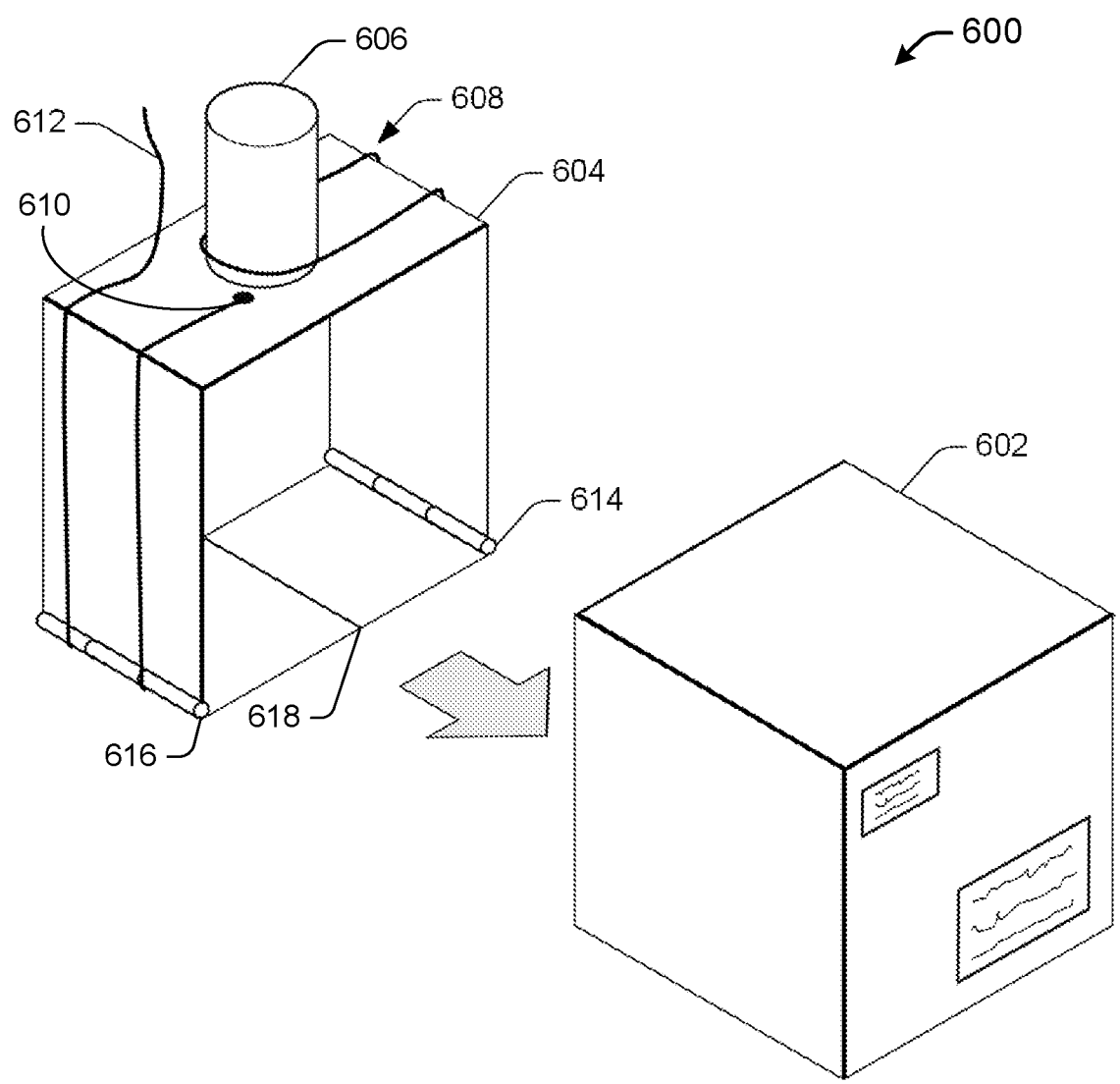
FIG. 6 is an isometric view of a package assembly including a wrapped lowering mechanism and a container, in accordance with embodiments of the disclosure.

FIG. 6 is an isometric view of a package assembly 600 including a wrapped lowering mechanism and a container, in accordance with embodiments of the disclosure. The container 602 may include the one or more items to be transported to a delivery location, as discussed in connection with FIGS. 1-5. Although the container 602 is illustrated as a cube, it may be understood in the context of this disclosure that the container 602 may be any suitable shape or size. Next, the package assembly 600 includes a band 604 sized to be securely fastened to the container 602, and may couple with the container 602 as indicated by the arrow illustrated in FIG. 5. For example, the band 604 may be tightened, clipped, secured, or coupled with a groove or indentation on the container 602 to prevent movement of the band 604 during operation. In an embodiment where the container 602 comprises a rectangular prism shape, the band 604 may be disposed about a long axis of the rectangle prism to maximize the rotation imparted on the package assembly 600, or may be disposed about the short axis of the rectangle prism to minimize the rotation imparted on the package assembly 600.

In some embodiments, a package attachment point 606 may provide an attachment point for the package assembly 600 to be attached to a UAV, in accordance with embodiments of the disclosure. Further, the package attachment point 606 may allow a tether 608 to reverse directions as the tether 608 is wrapped around the band, to provide the controlled rotation and descent as described above in connection with FIG. 3. In some embodiments, the band 604 may include a plurality of attachment points 606, pegs, hooks, or protrusions to allow the tether 608 to be wrapped in a plurality of configurations around the band 604. In some embodiments, the package attachment point 606 may be omitted from the package assembly 600 and replaced with a peg, hook, or protrusion configured to provide a wrapping point for the tether 608, while the package assembly 600 may be secured and released by the UAV using clamping arms or hooks, as discussed in the disclosure. In an alternate embodiment, the package assembly 600 may be configured as a single, integrated device, that is to say, the band 604 and the attachment point 606 may be integrated into the container 602.

In some embodiments, the tether 608 may be attached to the band 604 or the container 602 at various points to slow or modulate the descent of the package assembly 600. For example, the tether 608 may be tapped, glued, or otherwise secured to provide additional modulation of the descent of the package assembly 600.

The tether 608 may be attached to the band 604 at a band attachment point 610, and may wrap around the band, around the package attachment point 606, and back around the band 604 to terminate at the end point 612 of the tether 608. As may be understood in the context of this disclosure, the tether 608 may be wrapped around the band any number of times and in any manner to provide a desired sequence of rotations to the package assembly 600 when the package assembly 600 is released from the UAV (such as UAV 304 of FIG. 3) at a delivery location. In some embodiments, the tether 608 may be a monofilament line (e.g., similar to fishing line), a nylon or cotton line or string (e.g., similar to a kite string), a metal cable, a plastic line, ribbon, webbing, or the like. In some embodiments, the package assembly 600 may be assembled at a fulfillment center before the UAV is dispatched to the delivery location. In some embodiments, various bands may be pre-wound and selected at the time of delivery based on factors such as an altitude of the UAV intended for delivery, a weight of the item for delivery, weather at the time of delivery (e.g., the amount of wind), the method of separating the UAV and the package assembly 600 (e.g., whether the tether 608 remains with the package assembly 600 or with the UAV 304), or customer preference (e.g., whether the customer wishes to return or recycle the package assembly 600 after the package is delivered).

The band 604 may include release mechanisms 614 and 616 (e.g., one or more hinges, clamps, grips, paddles, etc.) that may be adapted to open or release the container 602 and subsequently allow the UAV 304 to retract the tether 608 and the band 604 to the UAV 304. For example, the release mechanisms 614 and 616 may comprise hinges that may open at point 618 to drop or leave the container 602 at a delivery location. In various embodiments, the release mechanisms 614 and/or 616 may include a sensor that senses a contact with the ground and releases the container 602 in response to sensing the ground, or the release mechanism may include a wired or wireless connection to the UAV 304 to release the container 602 at a designated point in time or altitude above the ground. Further, the release mechanisms 614 and/ or 616 may be triggered by tension in the tether 608 at the band attachment point 610, for example. In such an example, when the tether 608 is fully extended and tension is applied to the band attachment point 610, the release mechanisms 614 and/or 616 may be triggered to open and drop and/or release the container 602 to the delivery location. In some embodiments, the band attachment point 610 may be coupled with a spring- loaded hinge proximate to the release mechanism 614 and/or 616, for example, to release the container 602 when the tether 608 is fully extended. In some embodiments, the wrapping of the tether 608 around the container 602 or band 604 may provide the mechanism that secures the container 602 in the band 604. For example, point 618 may include snaps or indentations designed to release when not secured by the tether 608. When the tether 608 is unwrapped from the band 604, the point 618 may open, releasing the container 602 from the band 604. In some embodiments, the band 604 may comprise a thin molded plastic band configured with a biased component to deflect outward when not constrained by the tether 608. After the container 602 is released from the band 604, the band 604 may be retracted, raised, or returned to the UAV 304 for stowing and transit, in accordance with embodiments of the disclosure.

Figure 7:
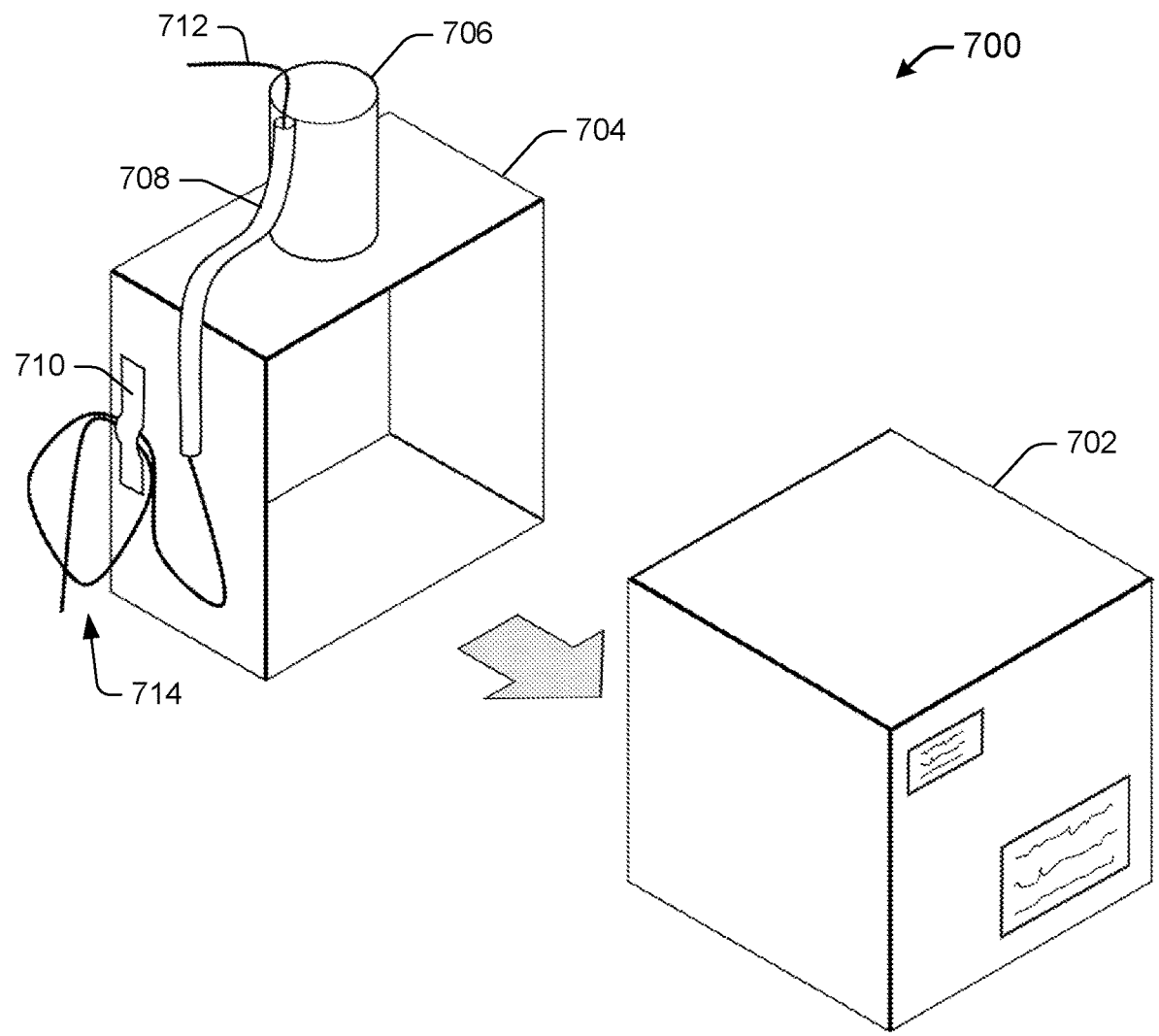
FIG. 7 is an isometric view of a package assembly including a rappel lowering mechanism and a container, in accordance with embodiments of the disclosure.

FIG. 7 is an isometric view of a package assembly 700 including a rappel lowering mechanism and a container, in accordance with embodiments of the disclosure. The container 702 may include one or more items to be transported to a delivery location, as discussed in connection with FIG. 4. A band 704 is provided to allow the band 704 and associated components to be selected based on factors such as the weight of the item in the container 702, and is attached to the container 702 before the UAV 404 departs for a delivery. A package attachment point 706 is coupled with the band 704, which may be selectively attached and released from the UAV 404 for transport and delivery, respectively. The band 704 may include a rappel mechanism 708 and a tether restraint 710. In some embodiments, the tether restraint 710 may include a piece of tape or a mechanism to release the tether 714 after package assembly 700 is released from the UAV 404. For example, when the package assembly 700 is released, the tape of the tether restraint 710 may be pulled away to release the tether 714 to descend ahead of the package assembly 700. Further, in an embodiment where the tether restraint 710 includes an adhesive tape, the adhesive tape may be selected such that one end of the tape releases the tether 714, while another end of the tape remains fixed to the package assembly 700. In some embodiments, the tether restraint 710 may be mechanically operated to release the tether before the package assembly 700 is released. In some embodiments, the tether restraint 710 may be integrated with the UAV 404 and/or operated by the UAV 404 to deploy the tether 714 when the UAV 404 arrives at the delivery location. A first end of the tether 712 may be attached to the UAV 404 in any manner and routed through the rappel mechanism 708, while the remaining portion of the tether 714 may be secured by the tether restraint 710. In some embodiments, the package attachment point 706 may be omitted from the package assembly 700 and instead the package assembly 700 may be secured and released by the UAV 404 using clamping arms or hooks, as discussed in the disclosure. Further, it may be apparent in the context of this disclosure that the rappel mechanism 708 may be coupled with the package assembly 700 in any location, for example, to minimize any protrusion from the package assembly 700.

In this rappel-type embodiment, when the UAV 404 arrives at the delivery location, the tether 714 may be released, lowered, or dropped by the tether restraint 710 and/or by the UAV 404. Following the deployment of the tether 714, the package assembly 700 may be released from the UAV 404, and the serpentine structure of the rappel mechanism 708 may generate friction between the tether 714 and the rappel mechanism 708 to allow the package assembly 700 to descend at a controlled rate. As may be understood in the context of this disclosure, the tether material (e.g., with a corresponding coefficient of friction, width, thickness, stiffness, roughness, abrasion resistance, etc.) may be selected in conjunction rappel mechanism 708 to provide a desired descent rate based on a weight of the package assembly 700. For example, the tether 714 may be thin, smooth, pliable, or otherwise configured to allow the package assembly 700 to descend rapidly when first released from the UAV 404. As the package assembly 700 descends along the tether 714, the tether may thicken, roughen, stiffen, or otherwise be configured to slow the descent of the package assembly 700. In various embodiments, the package assembly 700 may include a braking mechanism to slow the descent of the package assembly 700, or to increase the rate of descent of the package assembly 700 when a sway is detected or according to a schedule.

Figure 8:
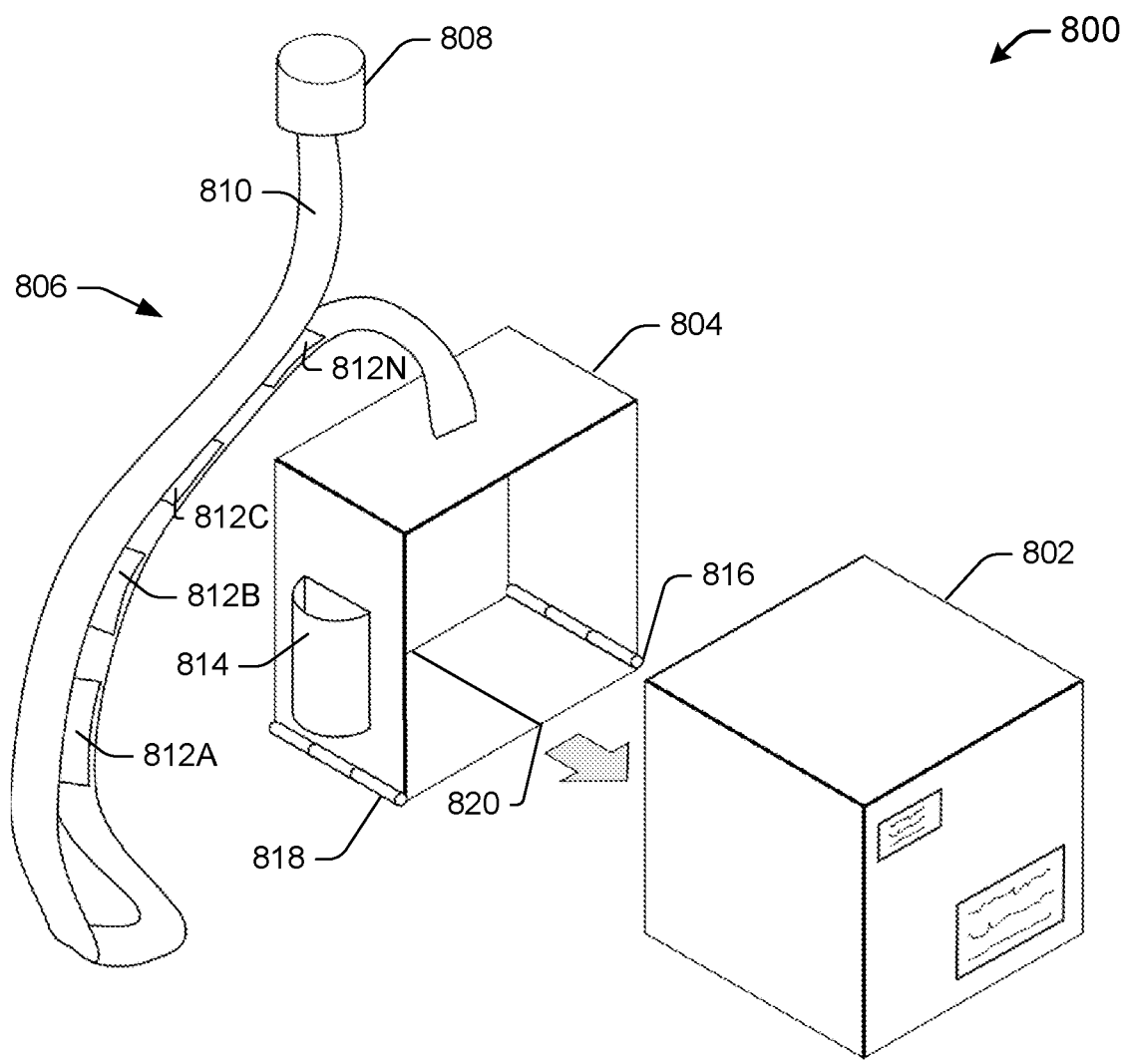
FIG. 8 is an isometric view of a package assembly including a rip-strip lowering mechanism and a container, in accordance with embodiments of the disclosure.

FIG. 8 is an isometric view of a package assembly 800 including a rip-strip lowering mechanism and a container, in accordance with embodiments of the disclosure. The container 802 may include one or more items to be transported to a delivery location, as discussed in connection with FIG. 5. A band 804 is provided to allow the band 804 and associated components to be selected based on factors such as the weight of the item in the container 802, and may be attached to the container 802 before the UAV 504 departs for a delivery. A rip-strip 806 may be coupled to the band 804 at a first end point and may be attached to the UAV 504 at a rip-strip attachment point 808, for example. In an alternate embodiment, the rip-strip 806 may be coupled directed with the container 802 and the band 804 may be omitted. The rip-strip 806 may be formed of any material such as webbing, rope, plastic, metal, or the like, and may be folded in half as illustrated in FIG. 8, for example, with each half fixed together with fasteners 812A, 812B, 812C, . . . , 812N (referred to collectively as fasteners 812). In various embodiments, the fasteners may be hook-and-loop fasteners, buttons and snaps, magnets, adhesive, or the like. In various embodiments, the rip strip 806 may include a single fastener, such as a continuous strip of a hook-and-loop fastener. As discussed above, the number and strength (e.g., test or rating) of the fasteners may be selected based on a weight of the package assembly 800 and/or a desired rate of descent. Additionally, the length of the rip-strip 806 may be selected based on a drop elevation of the UAV 504, as well as whether the package assembly 800 is to contact the ground before the rip-strip 806 is fully extended. In some embodiments, the rip-strip 806 may be folded in various dimensions (e.g., other than being folded in half). For example, only a portion of the rip-strip 806 may be folded over and secured with fasteners 812, leaving a portion of the rip-strip 806 unencumbered to allow the package assembly 800 to freefall before the fasteners 812 are engaged to control the descent of the package assembly 800.

The rip-strip 806 may be folded, compacted, or otherwise organized and stowed into a rip-strip retainer 814 during transport. In some embodiments, the rip-strip 806 may be folded and stowed such that when the package assembly 800 is released from the UAV 504 at the delivery location, the descent of the package may deploy the rip-strip 806 from the rip-strip retainer 814.

The band 804 may include release mechanisms 816 and 818 (e.g., one or more hinges, clamps, grips, paddles, etc.) that may be adapted to open or release the container 802 and allow the UAV 504 to retract the rip-strip 806 and the band 804 to the UAV 504. In various embodiments, the release mechanisms 816 and/or 818 may include a sensor that senses a contact with the ground and releases the container 802 in response to sensing the ground, or the release mechanism may include a wired or wireless connection to the UAV 504 to release the container 802 at a designated point in time or altitude above the ground. Further, the release mechanisms 816 and/or 818 may be triggered by tension in the rip-strip 806. In such an example, when rip-strip 806 is fully extended, the release mechanism 816 may be triggered to open (e.g., at point 820) and drop and/or release the container 802 to the delivery location. For example, tension in the rip-strip 806 may trigger spring-loaded hinges to open and drop the container 802. After the container 802 is released from the band 804, the band 804 and the rip-strip 806 may be retracted, raised, or returned to the UAV 504 for stowing and transit, in accordance with embodiments of the disclosure. The release mechanisms are also described above in connection with FIG. 6.

FIGS. 9A, 9B, 9C, and 9D illustrate various embodiments for managing a tether after delivering a package, as illustrated in FIGS. 1-5.

Figure 9A:
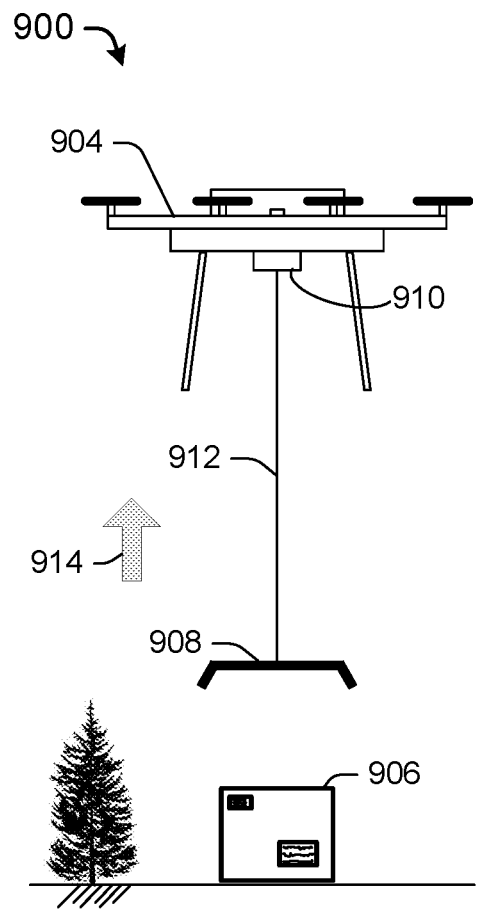
FIG. 9A is a pictorial diagram of an operation to retract a platform or tether after a package has been delivered to a delivery location, in accordance with embodiments of the disclosure.

FIG. 9A is a pictorial diagram of an operation 900 to retract a platform or tether after a package has been delivered to a delivery location, in accordance with embodiments of the disclosure.

At 902, after a package has been delivered, the platform or tether may be retracted by the UAV. For example, the UAV 904 may deliver a package 906 to a delivery location using the platform 908 coupled with a winch mechanism 910 and tether 912. After the package 906 is decoupled with the platform 908, the winch mechanism 910 may spool in or retract the tether 912 so that the platform 908 may be stowed during transport to a fulfillment center, for example. Further, in the embodiments discussed in FIGS. 3-5, the respective tethers 312, 414, and 530 may be retracted after the respective package are delivered. Arrow 914 illustrates that the platform 908 may retract upward to remain with the UAV 904.

In some embodiments where tethers 312, 414, and 530 are coupled with a winch mechanism or spooling mechanism, the tethers 312, 414, and 530 may include a weight or friction mechanism to provide tension on the tethers to allow the tether to be tightly wound around the winch or spool while retracting the tether. For example, the tethers 312, 414, and 530 may run through a friction mechanism that provides friction on the tether only when the tether is being retracted, such as synthetic fibers or artificial fish scales oriented to provide friction in one direction.

Figure 9B:
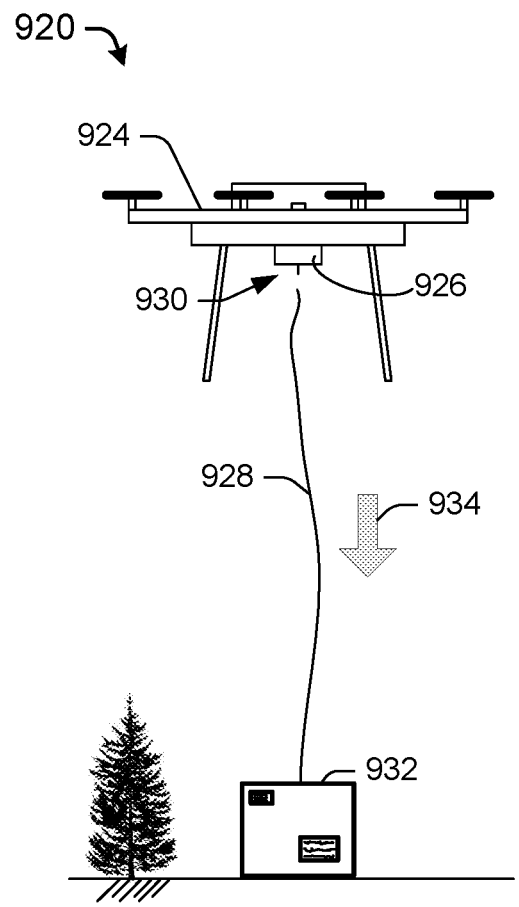
FIG. 9B is a pictorial diagram of an operation to cut or detach a tether after a package has been delivered to a delivery location, in accordance with embodiments of the disclosure.

FIG. 9B is a pictorial diagram of an operation 920 to cut or detach a tether after a package has been delivered to a delivery location, in accordance with embodiments of the disclosure.

At 922, after a package has been delivered, the tether or line may be cut, detached, sectioned, or otherwise severed from the UAV 924. In this example, a tether attachment mechanism 926 may detach the tether 928 at a point 930 proximate to the UAV 924, such that the tether 928 falls to the ground with a package 932 delivered at a delivery location. In some embodiments, the tether attachment mechanism 926 may include a spring-loaded or electrically driven mechanism such as one or more magnets, electromagnets, solenoid latches, etc. to anchor the tether 928 with the UAV 924. For example, if an electromagnet is relied upon as the tether attachment mechanism 926, the electromagnet may be powered or actuated to hold the tether 928. When power to the electromagnet is cut off, the electromagnet may be demagnetized and release the tether 928. If an electro-permanent magnet is relied upon, a permanent magnet may hold the tether 928. When power is provided to the electro-permanent magnet, current that flows through the electro-permanent magnet may demagnetize, oppose, or overcome the magnetization of the permanent magnet and release the tether 928.

In some embodiments, the tether attachment mechanism 926 may include a cutting mechanism such as a blade, saw, and/or heat to cut, sever, or section the tether 928 from the UAV 924. For example, a heat-based cutting mechanism may be used to cut the tether 928 when the tether 928 is a continuous spool of monofilament line. By contacting the monofilament line to a hot wire in the tether attachment mechanism 926, for example, the tether 928 may be cut and the tether 928 and package 932 may remain at the delivery location. Downward arrow 934 illustrates that the tether 928 falls to the ground after being detached from the UAV 924.

Figure 9C:
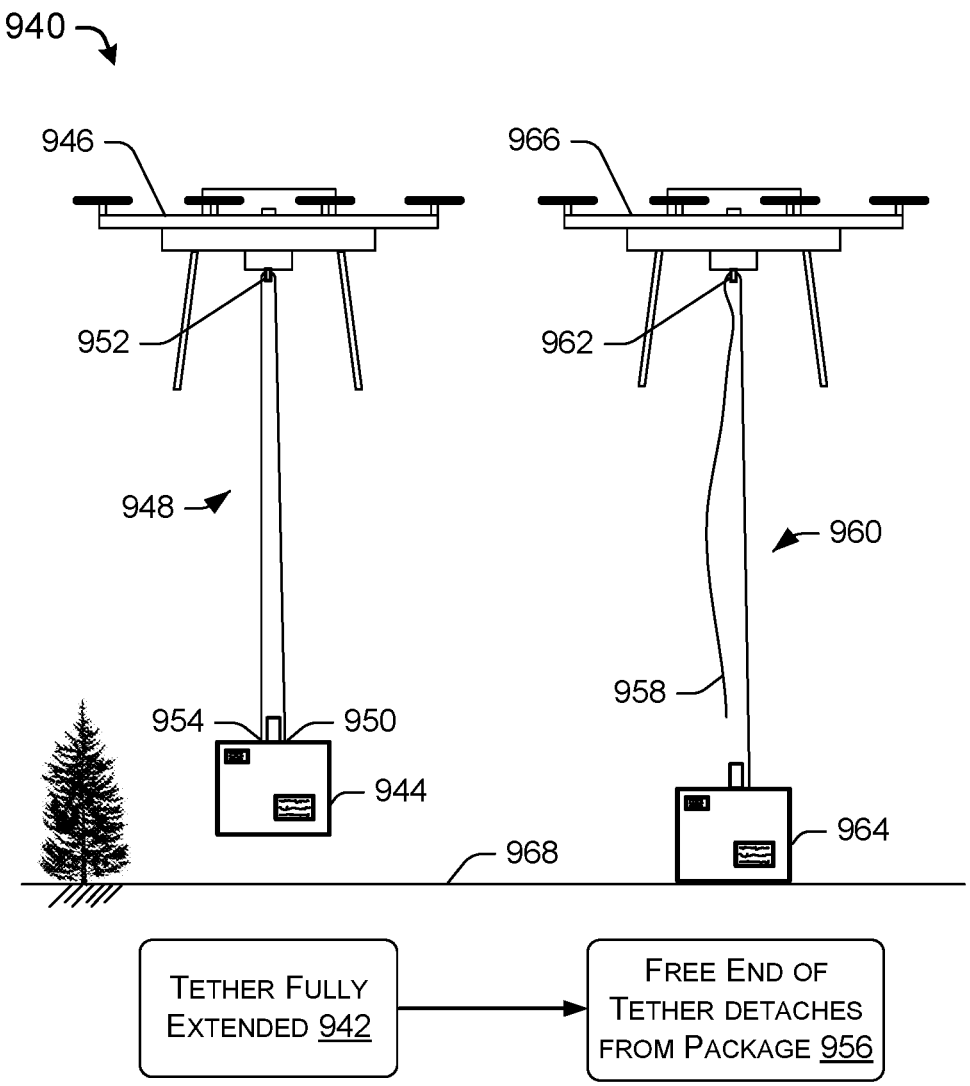
FIG. 9C is a pictorial flow diagram of an operation to separate a tether from a UAV after a package has been delivered to a delivery location, in accordance with embodiments of the disclosure.

FIG. 9C is a pictorial flow diagram of an operation 940 to separate a line or tether from a UAV after a package has been delivered to a delivery location, in accordance with embodiments of the disclosure.

At 942, a tether is fully extended, for example, after the package 944 is released by the UAV 946 in accordance with the embodiments of the disclosure. For example a tether 948 is secured to the package 944 at point 950, extends up through an attachment mechanism 952, and returns to the package 944 at point 954. In various embodiments, operation 940 illustrates the package assembly described in FIG. 3, at a moment in time when the package 944 has stopped rotating after descending from the UAV 946. While the tether 948 was wrapped around the package 944, the free end 954 of the tether 948 was constrained by the tether 948 wrapped around itself, for example.

At 956, the free end 958 of the tether detaches from the package 964. Subsequently, the free end 958 of the tether 960 may run freely through the attachment point 962, thereby detaching the package 964 and the tether 960 from the UAV 966. If an altitude of the UAV 966 above the ground 968 is greater than the fully extended length of the tether 960, the free end 958 of the tether 960 may detach from the package 964 while the package 964 is above the ground, causing the package 964 to descend to the ground 968 with one side of the tether 960 attached to the package 964. If the altitude of the UAV 966 above the ground 968 is less than the fully extended length of the tether 960, the UAV 966 may increase its altitude to fully extend the tether 960 to detach the free end 958 of the tether 960 from the package 964.

Figure 9D:
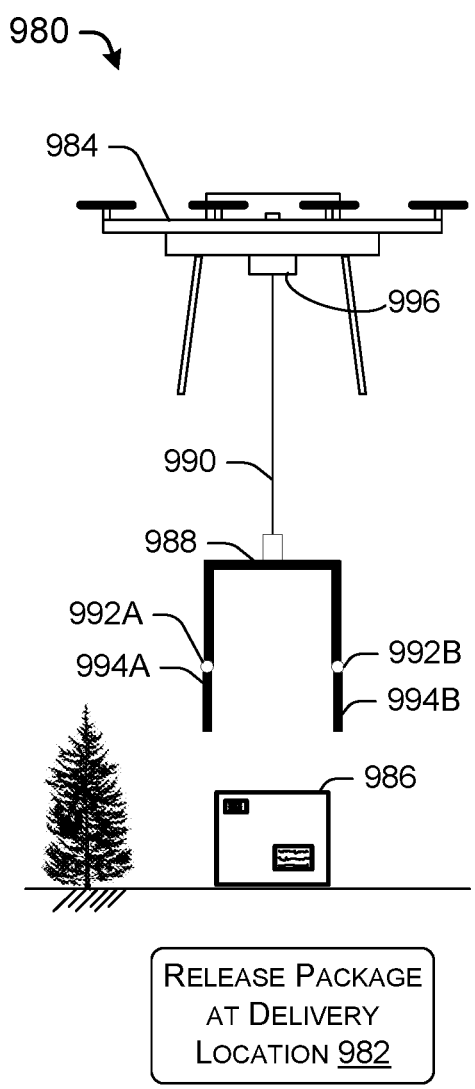
FIG. 9D is a pictorial diagram of an operation to release a package at a delivery location, in accordance with embodiments of the disclosure.

FIG. 9D is a pictorial diagram of an operation to release a package at a delivery location, in accordance with embodiments of the disclosure.

At 982, a package is released at the delivery location. For example, the UAV 984 may deliver the package 986 using a band 988 such as the bands 604, 704, and/or 804 of FIGS. 6, 7, and 8, respectively. For example, the tether 990 may be the tethers 224, 312, 414, 608, or 714 or the rip-strips 512 or 806, as described throughout this disclosure. When the package 986 is lowered in accordance with embodiments of the disclosure, release mechanisms 992A and 992B may open sections 994A and 994B of the band 988, thereby releasing the package 986 at the delivery location. In some embodiments, the release mechanisms 992A and 992B may correspond to those discussed in connection with FIGS. 6 and 8. For example, the release mechanisms 992A and 992B may be triggered by tension in the tether 990 activating or triggering the release mechanisms 992A and 992B, such as a spring-loaded hinge. In other examples, the tether 990 wrapped around the band 988 may secure the package 986 in the band 988. That is to say, when the tether 990 is unwrapped from the band 988, the package 986 may be released at the delivery location.

The tether 990 may be coupled with a winch or spool mechanism 996 to retract the band 988 after the package 986 is delivered at a delivery location. For example, the winch mechanism 996 may include an electric motor to reel in the tether 990. In some embodiments, the winch mechanism 996 may include a spring-powered spool to raise the band 988 after the package 986 is delivered. For example, the spring may be sized such that the band 988 may not be retracted until the package 986 is delivered (e.g., when the weight coupled to the band 988 is reduced). In some embodiments, a spring in the winch mechanism 996 may be pre-wound (e.g., stored with energy) without the tether 990 wrapped around the spool to retract the tether 990 when the package 986 is delivered. In other embodiments, the winch mechanism 996 may be wound with the tether 990 and may pay out the tether 990 when the package 986 is released from the UAV 984. As the package 986 descends, the tether 990 may unspool from the winch mechanism 996, which in turn winds up a spring in the winch mechanism 996, thereby storing energy. When the package 986 is released from the band 988, the winch mechanism 996 may utilize the stored spring energy to retract the tether 990 and the band 988.

In various embodiments, the methods, apparatus, and systems described in connection with FIGS. 1-9 may be combined in any manner to provide an optimal system for delivering a package using a UAV. Further, it may be understood in the context of this disclosure that various delivery dropping method and mechanisms and detachment methods and mechanisms may be used as a fully active, fully passive, or a mixed system.

Figure 10:
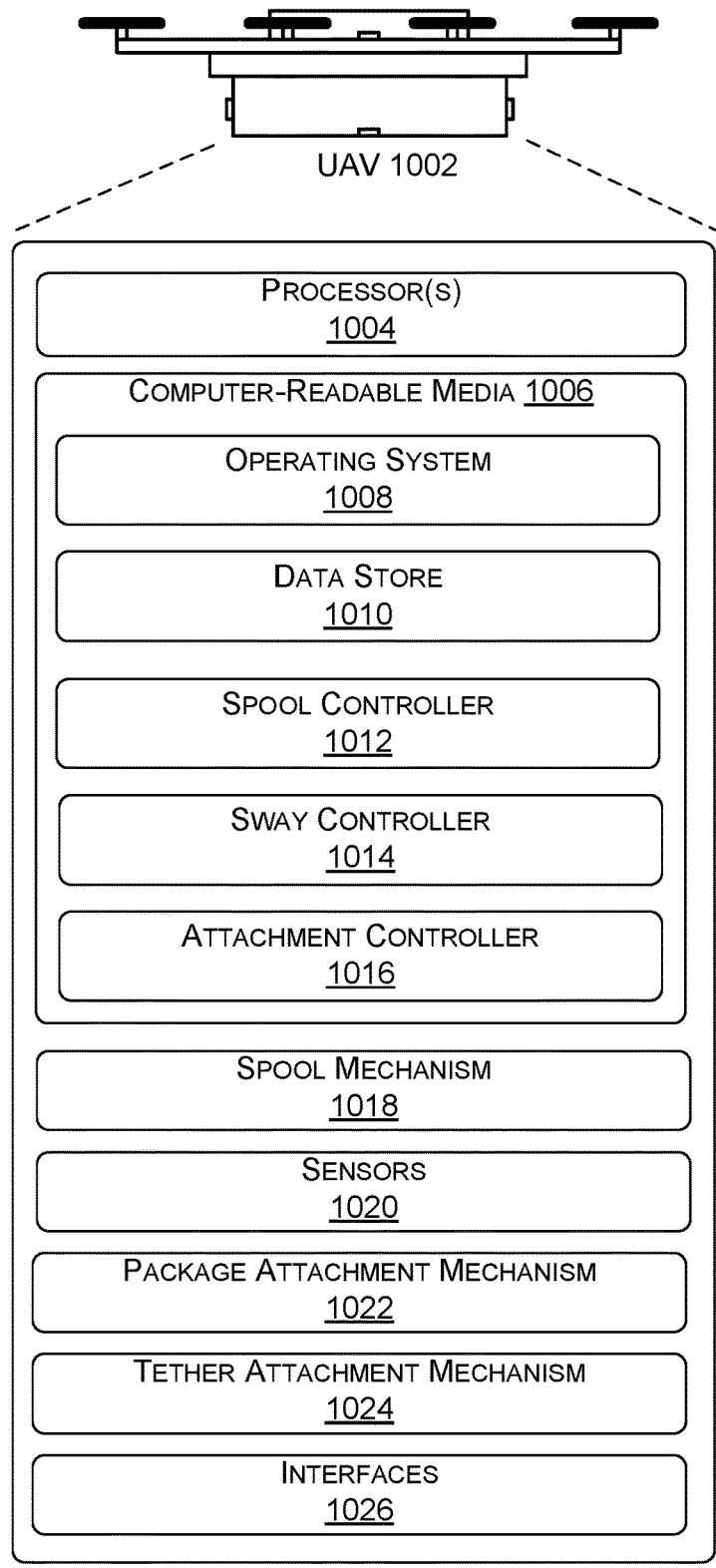
FIG. 10 is a block diagram of components of an example UAV including package assembly delivery components, in accordance with embodiments of the disclosure.

FIG. 10 is a block diagram of components of an exemplary UAV 1002 including package delivery components in accordance with embodiments of the disclosure.

In various examples, the UAV 1002 may correspond to the UAVs 104, 108, 110, 112, 114, 120, 204, 304, 404, 504, 904, 924, 946, 984 and/or 996. The UAV 1002 may include the various controllers and mechanisms to implement the delivery methods, apparatus, and systems described in accordance with embodiments of the disclosure. For example, to navigate the UAV 1002 to a delivery location, the UAV 1002 may be equipped with any number of motors, such as four, six, or eight motors, with each individual motor coupled to a propeller or rotor, with power provided to the motors and rotors via a power system.

UAV 1002 may include one or more processor(s) 1004 operably connected to computer-readable media 1006. The UAV 1002 may also include one or more interfaces 1026 to enable communication between the UAV 1002 and other networked devices, such as other UAVs, or with a networked delivery platform (such as the platform 208 in FIG. 2), in order to determine a sway or location of a package. The one or more interfaces 1026 may include network interface controllers (NICs), I/O interfaces, or other types of transceiver devices to send and receive communications over a network. For simplicity, other computers are omitted from the illustrated UAV 1002.

The computer-readable media 1006 may include volatile memory (such as RAM), non-volatile memory, and/or non-removable memory, implemented in any method or technology for storage of information, such as computer-readable instructions, data structures, program modules, or other data. Some examples of storage media that may be included in the computer-readable media include, but are not limited to, random access memory (RAM), read only memory (ROM), electrically erasable programmable read only memory (EEPROM), flash memory or other memory technology, compact disk (CD-ROM), digital versatile disks (DVD) or other optical storage, magnetic cassettes, magnetic tape, magnetic disk storage or other magnetic storage devices, or any other medium which can be used to store the desired information and which can be accessed by a computing device.

In some embodiments, the computer-readable media 1006 may include an operating system 1008 and a data store 1010. The data store 1010 may be used to locally store delivery information, for example.

In various examples, the computer-readable media 1006 may include a spool controller 1012. The spool controller 1012 may generate control signals to control the spool mechanism and may operate in conjunction with the sway controller 1014 to mitigate a sway of a package of the UAV 1002 during delivery. For example, the sway controller 1014 may determine a package sway and indicate to the spool controller 1012 to vary the rate of paying out or pulling in a tether to reduce the sway and stabilize the platform and/or package of the UAV 1002. That is to say, the sway controller 1014 may provide active (e.g., closed-loop) control to stabilize the platform and/or package of the UAV 1002. Further, the sway controller 1014 may further navigate the UAV 1002 by moving horizontally in the direction of the sway and/or by rapidly losing altitude to mitigate the sway of the platform and/or package of the UAV 1002.

In various examples, the computer-readable media 1006 may include an attachment controller 1016. The attachment controller 1016 may monitor and control the attachment and release of a package, tether, and/or rip-strip coupled with the UAV 1002. In some embodiments, the attachment controller 1016 may monitor data from the sensors 1020 to determine the UAV 1002 is in position to release a package. In some embodiments, the attachment controller 1016 may determine that a package has reached the ground, and/or may determine whether a tether should be detached from the UAV 1002.

In some embodiments, the UAV 1002 may also include a spool mechanism 1018 to lower a package and/or platform for delivery, or may to raise a package and/or platform after delivery, or after picking up a package. Further, as described throughout this disclosure, the spool mechanism may include a winch and/or drum and brake mechanism to spool tether in and/or out to control and mitigate a sway of the package and/or platform of the UAV 1002. As described herein, the spool mechanism 1018 may include an electric motor or a spring-powered motor, for example.

In some embodiments, the UAV 1002 may include sensors 1020 to provide input to the UAV 1002 for operation and control. The sensors 1020 may include, but are not limited to flight/delivery sensors such as digital cameras, spectral cameras (e.g., infrared), LIDAR, RADAR, global positioning system (GPS) sensors, chemical sensors, accelerometers, magnetometers, gyroscopes, pressure sensors, temperature sensors, wind speed sensors, altimeters, tether tension sensors, UAV resource sensors (e.g., battery sensors), etc. In some embodiments, data from the sensors 1020 may be used to determine whether the UAV 1002 is in position, or within a position threshold (e.g., location, elevation, drift, etc.) to initiate a delivery drop in accordance with embodiments of the disclosure. In some embodiments, the sensors 1020 may monitor the available resources or remaining resources of the UAV 1002, such as battery levels or power levels.

In some embodiments, the UAV 1002 may include a package attachment mechanism 1022. For example, the package attachment mechanism may include clamps, hooks, magnets, electromagnets, and/or electro-permanent magnets to secure the package during transport and release the package from the UAV 1002 and/or from the tether at the delivery location.

In some embodiments, the UAV 1002 may include a tether attachment mechanism 1024 to release a tether from the UAV 1002. For example, the tether attachment mechanism 1024 may include one or more clamps, hooks, magnets, electromagnets, electro-permanent magnets, solenoid latches, blades, saws, and/or heat-type cutting mechanisms, as would be understood in the context of this disclosure.

Figure 11:
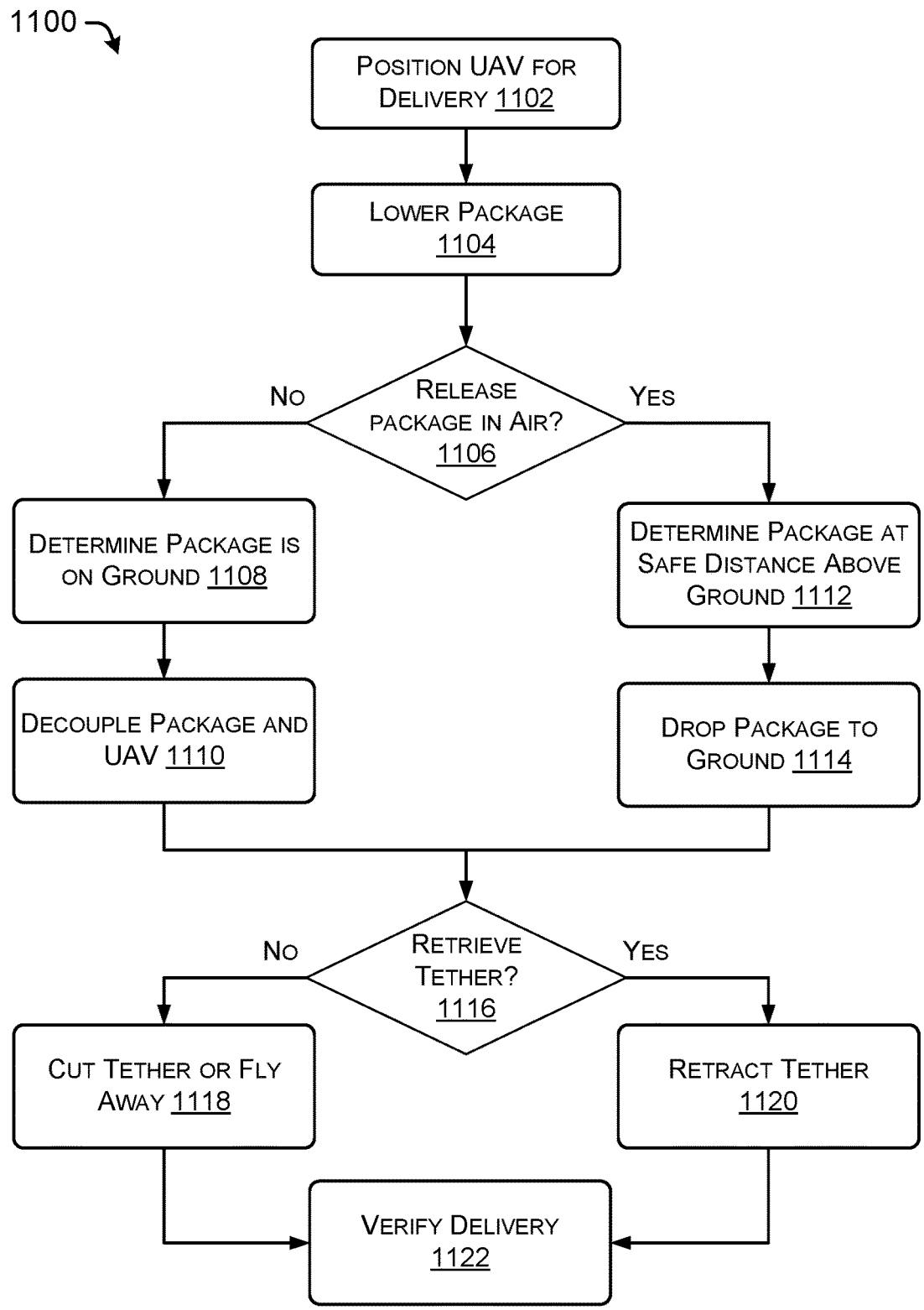
FIG. 11 is a flow diagram of an example process for delivering a package using a UAV, in accordance with embodiments of the disclosure.

FIG. 11 is a flow diagram of an example process 1100 for delivering a package using a UAV, in accordance with embodiments of the disclosure.

At 1102, the UAV is positioned for delivery. In some embodiments, operation 1102 includes the UAV traveling to a delivery location and positioning the UAV at a drop altitude associated with a selected delivery method. For example, the position of UAV may be determined based at least in part on the weather (e.g., steady or gusting wind), a size of the delivery location or drop zone, an item being delivered (e.g., whether the item is relatively robust or fragile), nearby obstacles (e.g., trees, buildings, people, other UAVs, etc.), noise restrictions, ground condition (e.g., firmness such as grass or concrete, or conditions such as wetness), and/or the type of tether technique selected for the delivery.

At 1104, the package is dropped and/or lowered from the UAV. For example, the package may be dropped or lowered in accordance with the embodiments discussed herein.

At 1106, it is determined whether to release the package in the air. This determination may be made on a number of factors, including, but not limited to, the type of delivery drop method, a size of the delivery location or drop zone, an item being delivered (e.g., whether the item is relatively robust or fragile), nearby obstacles (e.g., trees, buildings, people, other UAVs, etc.), noise restrictions, ground condition (e.g., firmness such as grass or concrete, or conditions such as wetness), and/or other factors. If it is determined not to release the package in the air, the package may be released on the ground, and the operation continues to operation 1108. If the package is to be released above the ground, the operation continues to operation 1112.

At 1108, it may be determined whether the package is on the ground. For example, the UAV may use sensors such as a camera to determine the position of the UAV with respect to the ground. In some embodiments, the UAV may include a tension sensor that determines a tension of the tether. When a tension of the tether is below a threshold, the UAV may determine that the package is on the ground, rather than the weight of the package being supported by the tether. In some embodiments, the UAV may determine the altitude of the UAV and may infer the package is on the ground based on a length of the tether. Further, operation 1108 may include determining that the package has been delivered with a delivery zone or within a threshold distance to an intended delivery location. In some embodiments, one or more techniques may be used in conjunction to determine that a package is on the ground.

At 1110, the package and the UAV are decoupled. For example, if a delivery platform is used to lower a package, the delivery platform may release the package for delivery. If a rappel-type lowering mechanism is used, the package may slide off the tether as the UAV ascends. If a rip-strip lowering mechanism is used, the rip-strip may be decoupled from the UAV, or the package may be decoupled from the rip-strip.

At 1112, when it is determined to release the package in the air at operation 1106, the descent of the package is monitored to determine whether the package is at a safe distance above the ground. A number of factors may determine whether a height of the package is "safe," including but not limited to, a size of the delivery location or drop zone, an item being delivered (e.g., whether the item is relatively robust or fragile), nearby obstacles (e.g., trees, buildings, people, other UAVs, etc.), ground condition (e.g., firmness such as grass or concrete, or conditions such as wetness), and/or an expected free fall based on the wind conditions and the inertia of the package, for example.

At 1114, the package is dropped to the ground. The package may be released according to any number of embodiments discussed in this disclosure. For example, the package may be actively decoupled from the delivery platform, such as the delivery platform 208 of FIG. 2, a tether may be cut, a package may slide off the end of a tether, or a package may unwind and release the package from the tether, as described throughout this disclosure.

At 1116, it is determined whether to retrieve a tether. For example, if the tether is not to be retrieved, the tether may be cut at operation 1118. In various embodiments, based on the operation of the delivery method, the tether may actively or passively decouple from the UAV during package delivery, and the UAV only needs to fly away in operation 1118. If the tether is to be retrieved, a winch mechanism or spooling mechanism may be used to retract the tether to the UAV. Further, in operation 1120, a tension on the tether may be maintained to facilitate spooling via a weight of the delivery platform, for example, a ballast or weight, or a friction mechanism providing friction to the tether, in accordance with embodiments of the disclosure.

At 1122, the delivery is verified. In some embodiments, the UAV may verify the delivery with a positional sensor attached to the package or situated at the delivery location, or the UAV may use an image sensor to verify the delivery.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. An unmanned aerial vehicle (UAV) comprising:
   an airframe;
   a power source coupled to the airframe to selectively provide power to propulsion units of the UAV to transport an item to a delivery destination;
   a package assembly to secure the item;
   an attachment mechanism to attach the package assembly to the UAV;
   a tether coupled to the package assembly;
   a tension sensor coupled to the tether to generate tension data based at least in part on a tension of the tether;
   an image sensor to generate image data capturing at least a portion of the package assembly and a reference point at the delivery destination;
   a lowering mechanism coupled to the airframe and coupled to the tether to selectively lower the package assembly via the tether;
   a sway controller coupled to the airframe to determine a sway of the package assembly based at least in part on the tension data and relative motion between the package assembly and the reference point represented in the image data, wherein the sway controller is configured to:
      determine that an amount of the sway is increasing, wherein the amount of the sway is based at least in part on a distance between a location of the package assembly and an equilibrium position of the package assembly; and
      provide, based at least in part on the amount of the sway increasing, the tension data, and the image data, a signal to the lowering mechanism to adjust a rate of lowering the package assembly to reduce the sway of the package assembly; and
   a package attachment controller coupled to the airframe to selectively operate the attachment mechanism to release the package assembly at least partially above the delivery destination.

2. The UAV of claim 1, further comprising:
   a wind speed sensor coupled to the UAV to generate third data, wherein the amount of the sway is further based at least in part on the third data.

3. The UAV of claim 1, wherein the tension sensor generates the tension data based at least in part on the tension in the tether and a rate of lowering the package assembly.

4. The UAV of claim 1, wherein the tension sensor generates the tension data based at least in part on the tension in the tether and at least one physical characteristic of the package assembly.

5. A method comprising:
   lowering a package assembly from an unmanned aerial vehicle (UAV) at a delivery location using a lowering mechanism of the UAV to lower the package assembly coupled to a tether;
   determining tension data representing tension in the tether with a sensor of the UAV;
   receiving image data representing at least a portion of the package assembly and a reference point at the delivery location;

determining a sway of the package assembly based at least in part on the tension in the tether represented by the tension data and relative motion between the package assembly and the reference point represented in the image data;

determining that an amount of the sway is increasing, wherein the amount of the sway is based at least in part on a distance between a location of the package assembly and an equilibrium position of the package assembly; and providing, based at least in part on the amount of the sway increasing, the tension data, and the image data, a signal to the lowering mechanism to adjust a rate of lowering the package assembly to reduce the sway of the package assembly.

6. The method of claim 5, wherein lowering the package assembly from the UAV comprises lowering the package assembly to a surface at the delivery location using the lowering mechanism.

7. The method of claim 5, wherein determining the sway of the package assembly is further based at least in part on the rate of lowering the package assembly.

8. The method of claim 5, wherein determining the sway of the package assembly is further based at least in part on physical characteristics of the package assembly.

9. The method of claim 5, further comprising:
releasing the package assembly in response to the sway being less than a threshold sway.

10. The method of claim 5, further comprising:
releasing the package assembly from the UAV at or above the delivery location.

11. The method of claim 10, further comprising:
prior to releasing the package assembly, determining, based at least in part on the tension being below a threshold, that the package assembly is on a ground surface.

12. The method of claim 5, wherein the signal is a first signal and the rate is a first rate, and further comprising:
determining, after providing the first signal, continued sway of the package assembly based at least in part on the tension in the tether and the image data; and
providing a second signal to the lowering mechanism to adjust a second rate of lowering the package assembly to further reduce the sway of the package assembly.

13. The method of claim 5, wherein the sensor is a first sensor, and further comprising:
monitoring a wind speed with a second sensor of the UAV, and
wherein determining the sway of the package assembly is further based at least in part on the wind speed.

14. The method of claim 5, wherein the sensor is a first sensor, further comprising:
monitoring, via a second sensor, a change in an angle of the tether with respect to the UAV, and
wherein determining the sway of the package assembly is further based at least in part on the change in the angle of the tether.

15. An unmanned aerial vehicle (UAV) comprising:
an airframe;
a plurality of propulsion units coupled to the airframe;
an attachment mechanism to attach a package assembly to the UAV;
a lowering mechanism coupled to the airframe to lower the package assembly using a tether;
one or more sensors coupled to the airframe;
one or more processors coupled to the airframe; and
memory coupled to the one or more processors, the memory including one or more computer-executable instructions that are executable by the one or more processors to perform operations comprising:
causing the propulsion units to position the UAV at a predetermined height above a delivery location;
lowering the package assembly from the UAV at the delivery location using the lowering mechanism of the UAV to dispense the tether;
determining tension data representing a tension in the tether coupled to the package assembly using the one or more sensors;
receiving, from the one or more sensors, image data representing at least a portion of the package assembly and a reference point at the delivery location;
determining a sway of the package assembly based at least in part on the tension in the tether represented by the tension data and relative motion between the package assembly and the reference point represented in the image data;
determining that an amount of the sway is increasing, wherein the amount of the sway is based at least in part on a distance between a location of the package assembly and an equilibrium position of the package assembly; and
providing, based at least in part on the amount of the sway increasing, the tension data, and the image data, a signal to the lowering mechanism to adjust a rate of lowering the package assembly to reduce the sway of the package assembly.

16. The UAV of claim 15, wherein the operations performed by the one or more processors further comprise:
releasing the package assembly from the UAV at or above the delivery location.

17. The UAV of claim 16, wherein the operations performed by the one or more processors further comprise:
prior to releasing the package assembly, determining, based at least in part on the tension being below a threshold, that the package assembly is on a ground surface.

18. The UAV of claim 15, wherein the signal is a first signal and the rate is a first rate, and the operations performed by the one or more processors further comprise:
determining, after providing the first signal, continued sway of the package assembly based at least in part on the tension in the tether; and
providing a second signal to the lowering mechanism to adjust a second rate of lowering the package assembly to further reduce the sway of the package assembly.

19. The UAV of claim 15, wherein the operations performed by the one or more processors further comprise:
monitoring, using at least one of the one or more sensors, a wind speed with the one or more sensors of the UAV, and
wherein determining the sway of the package assembly is further based at least in part on the wind speed.

20. The UAV of claim 15, wherein the operations performed by the one or more processors further comprise:
monitoring, using at least one of the one or more sensors, a change in angle of the tether with respect to the UAV, and
wherein determining the sway of the package assembly is further based at least in part on the change in the angle of the tether.

* * * * *